(12) United States Patent
Greenwood et al.

(10) Patent No.: US 12,354,501 B2
(45) Date of Patent: Jul. 8, 2025

(54) USING AUGMENTED REALITY FOR INTERACTING WITH RADIATION DATA

(71) Applicant: UT-Battelle, LLC, Oak Ridge, TN (US)

(72) Inventors: M. Scott Greenwood, Oak Ridge, TN (US); Michael B. R. Smith, Oak Ridge, TN (US); Nick Thompson, Oak Ridge, TN (US); Noel B. Nelson, Oak Ridge, TN (US); Douglas E. Peplow, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 271 days.

(21) Appl. No.: 18/134,649

(22) Filed: Apr. 14, 2023

(65) Prior Publication Data
US 2024/0029579 A1     Jan. 25, 2024

Related U.S. Application Data

(60) Provisional application No. 63/438,888, filed on Jan. 13, 2023.

(51) Int. Cl.
*G09B 9/00* (2006.01)
*G06F 3/01* (2006.01)
*G06F 3/16* (2006.01)

(52) U.S. Cl.
CPC ............. *G09B 9/00* (2013.01); *G06F 3/011* (2013.01); *G06F 3/017* (2013.01); *G06F 3/167* (2013.01)

(58) Field of Classification Search
None
See application file for complete search history.

(56) References Cited

U.S. PATENT DOCUMENTS

| | | | |
|---|---|---|---|
| 2017/0220716 A1* | 8/2017 | Padoy | A61N 5/1048 |
| 2018/0330542 A1* | 11/2018 | Bharti | G02B 27/0172 |
| 2019/0197788 A1* | 6/2019 | Forbes | G06T 15/005 |
| 2021/0080321 A1* | 3/2021 | Kaehler | G01J 3/0262 |

OTHER PUBLICATIONS

Smith et al., "Virtual Interaction with Physics Enhanced Reality (VIPER): Using Augmented Reality to Visualize and Interact with Ionizing Radiation Data", Conf 2022 ANS Annual Meeting Jun. 2022 (Year: 2022).*

Augmented reality technology transforms how workers see radiation, posted on Youtube Feb. 21, 2022 @ https://www.youtube.com/watch?v=9fTk2qjZc5w (Year: 2022).*

(Continued)

*Primary Examiner* — Yingchun He
(74) *Attorney, Agent, or Firm* — Lempia Summerfield Katz LLC

(57) ABSTRACT

Interactive augmented-reality technologies track simulated-radiation exposure of a user moving through a physical scene. The simulated-radiation exposure tracking is performed using radiation voxels associated with a simulated radiation field caused as if a radioactive source of a particular type was emitting radiation from a predetermined location of the scene. Each radiation voxel is indicative of a respective level of the simulated radiation field at the voxel's scene location.

33 Claims, 31 Drawing Sheets
(13 of 31 Drawing Sheet(s) Filed in Color)

(56) References Cited

OTHER PUBLICATIONS

B. T. Rearden and M. A. Jessee, "SCALE Code System, Chapter 4.0: Radiation Shielding," ORNL/TM-2005/39, version 6.2.3, Oak Ridge National Laboratory, pp. 4-1 to 4-153, (2018).

Bellanca, Jennica L., et al., "Developing a Virtual Reality Environment for Mining Research," Mining, Metallurgy & Exploration 36., pp. 597-605, (2019).

Khoshelham, K., Tran, H., and Acharya, D., "Indoor Mapping Eyewear: Geometric Evaluation of Spatial Mapping Capability of Hololens," Int. Arch. Photogramm. Remote Sens. Spatial Inf. Sci., XLII-2/W13, pp. 805-810, (2019).

Michael B. R. Smith and M. Scott Greenwood, "Modern Techniques for Visualizing Radiation Data in Nuclear Space Scenarios," presented at the Nuclear and Emerging Technologies for Space, Abstract, (2020).

M. Scott Greenwood and Michael B. R. Smith, "Method for Visualizing Radiation Data Using Unreal Engine," Transactions of the American Nuclear Society, V123, No. 1, pp. 1167-1170, (2020).

N. Petoussi-Henss et al., ICRP Publication 116 "Conversion Coefficients for Radiological Protection Quantities for External Radiation Exposures, Annex A: Effective Dose Conversion Coefficients" pp. 125-137, (2010).

Orr, T.J., Bellanca, J.L., Navoyski, J., Macdonald, B., Helfrich, W., Demich, B., AHFE 2019: "Development of Visual Elements for Accurate Simulation," pp. 287-299, (2019).

Teletrix. (Jan. 7, 2022) Teletrix Radiation Training Simulators: Alara Support [Brochure] pp. 1-11.

Teletrix. (Jan. 7, 2022) GMT Series 486 Gas Monitor Trainer [Brochure] pp. 1-2.

Teletrix. (Jan. 7, 2022) Simulated Contamination Monitors: Personnel & Equipment Monitoring Simulators Raise Contamination Awareness [Brochure] pp. 1-2.

Teletrix. (Jan. 7, 2022) Simulated Radiation Source: SRS900 Series [Brochure] pp. 1-2.

Teletrix. (Jan. 7, 2022) Virtual Plumes and Teletrix Simulators: EP Drill Solution [Brochure] pp. 1-3.

Teletrix. (Jan. 7, 2022) VIZRAD: Interactive Radiation Training Solutions [Brochure] pp. 1-2.

\* cited by examiner

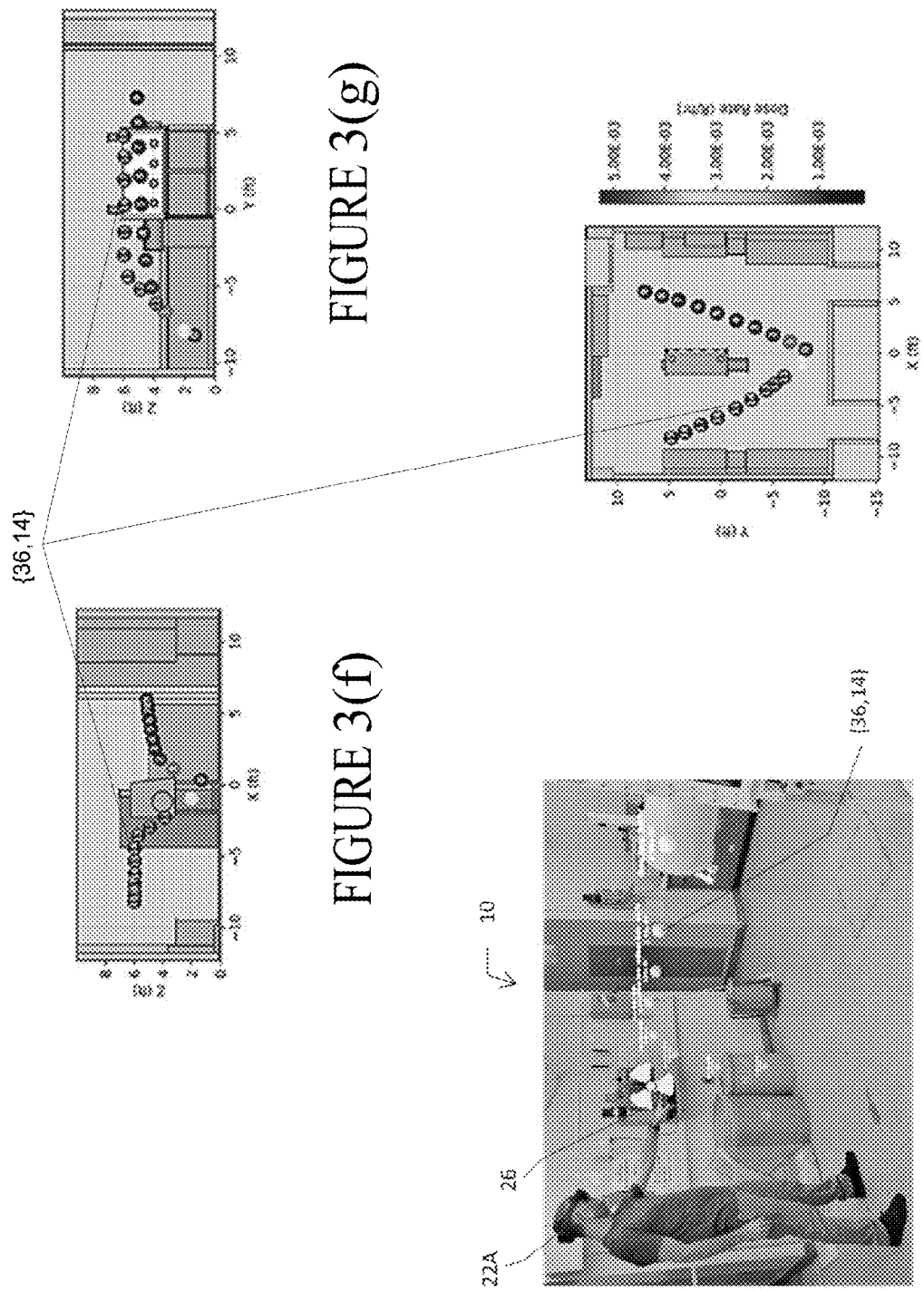

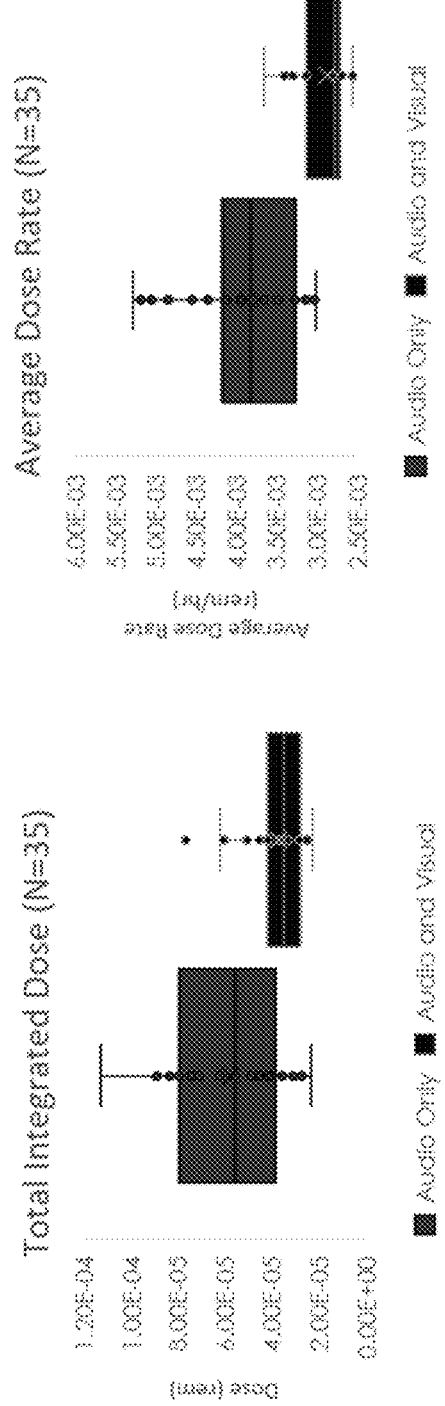
FIGURE 4(j)
FIGURE 4(k)
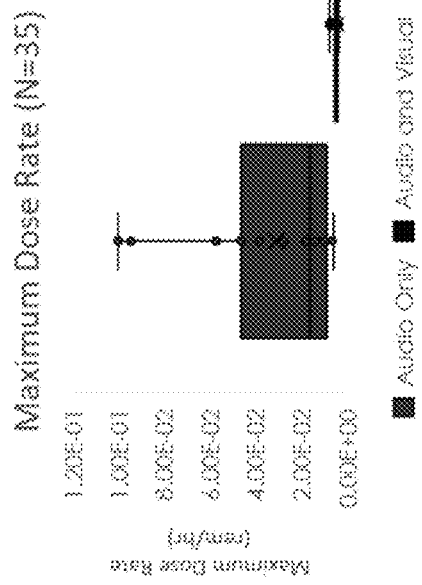
FIGURE 4(l)

USING AUGMENTED REALITY FOR INTERACTING WITH RADIATION DATA

PRIORITY CLAIM

This application claims priority to U.S. Provisional Patent Application No. 63/438,888, titled "Using Augmented Reality for Visualizing and Interacting with Ionizing Radiation Data", which was filed on Jan. 13, 2023, which is herein incorporated by reference.

STATEMENT REGARDING FEDERALLY SPONSORED RESEARCH AND DEVELOPMENT

The technologies described herein were developed with government support under Contract No. DE-AC05-00OR22725 awarded by the U.S. Department of Energy. The government has certain rights in the described technologies.

BACKGROUND

Technical Field

This disclosure relates to augmented reality and more specifically to rendering and interacting with temporal and spatial immersive experiences in augmented radiation environments.

Conventional Technical Solutions

Radiation is monitored and measured by detectors, film badges, and rings. Detectors are used to evaluate momentary radiation levels while badges and rings are used to assess accumulated radiation levels.

While there are physical radiation monitoring and training tools, there are few immersive tools available to radiological operational and training teams. Known tools are limited in their ability to visually convey complex three-dimensional radiation information to users in an intuitive, an interactive, and an effective manner.

DESCRIPTION OF THE DRAWINGS

The patent or application file contains at least one drawing executed in color. Copies of this patent or patent application publication with color drawing(s) will be provided by the Office upon request and payment of the necessary fee.

The technologies may be better understood with reference to the following drawings and description. The components in the figures are not necessarily to scale, emphasis instead being placed upon illustrating the principles of the invention. Moreover, in the figures, like-referenced numerals designate corresponding parts throughout the different views. The patent or application file also contains at least one drawing executed in color. Copies of this patent or patent application publication with color drawing(s) will be provided by the Office upon request and payment of the necessary fee.

FIGS. 3(e)-3(h) show aspects of the techniques for performing the second use case.

FIGS. 4(e)-4(l) show aspects of the techniques for performing the third use case.

DETAILED DESCRIPTION

Figure 1A:
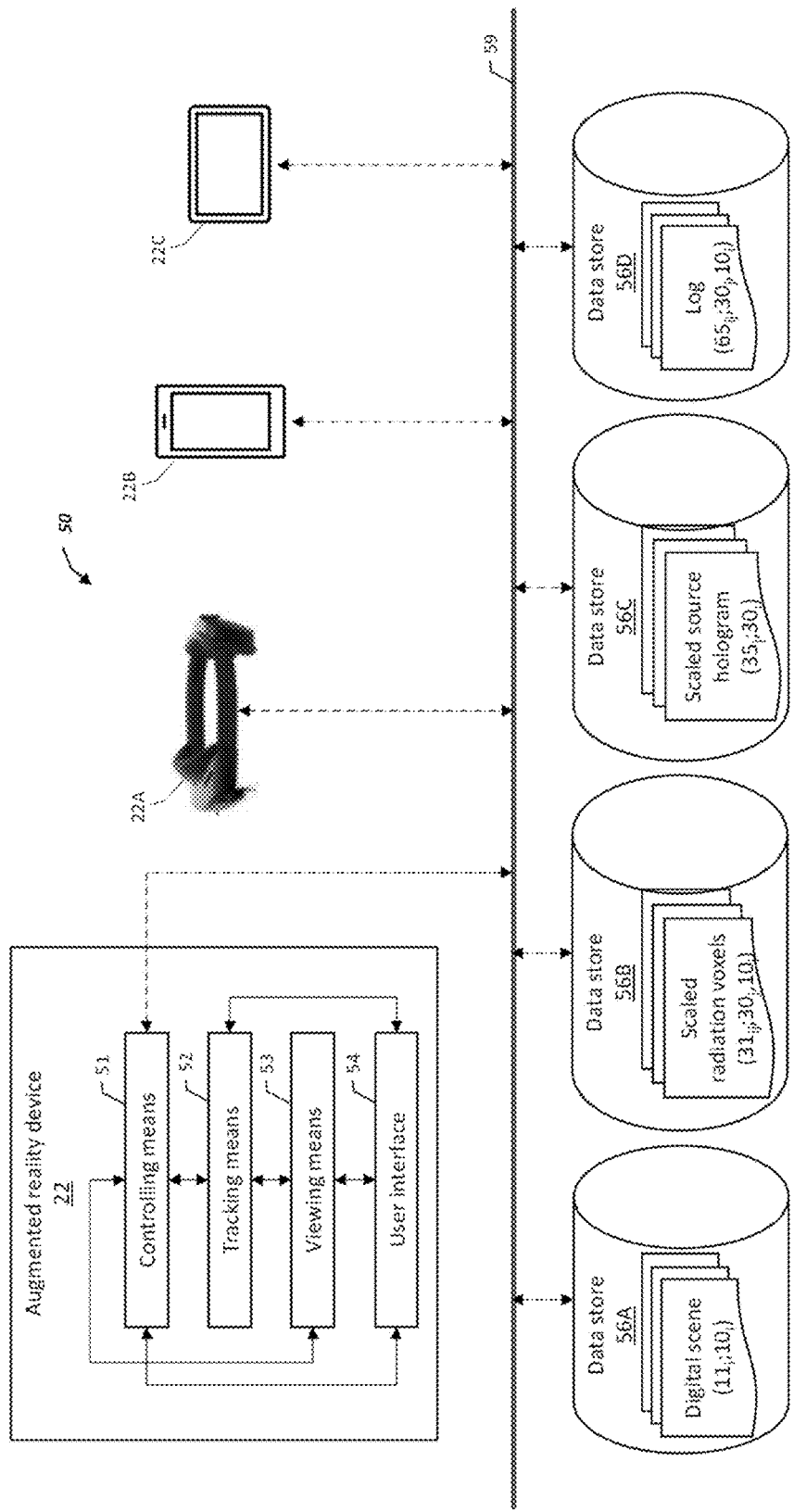
FIG. 1(a) is a diagram of an example of a system for interacting with simulated radiation data using augmented reality.

Interactive augmented reality systems improve training, education, and worker perception of ionizing radiation. The interactive augmented reality systems, interchangeably referred to as interactive augmented reality techniques, provide intuitive, efficient, and physically accurate training environments of complex three-dimensional ionizing radiation fields. The systems provide users with the ability to "see" ionizing radiation in three-dimensional environments. The systems present and track real-world environments and accurately combine simulated radiation holograms in a user's field of view, superimposed onto real-world environments and/or execute simulated radiation events in those environments.

Some radioactive source emissions are precalculated, dynamically produced, and superimposed into the user's field of vision. These simulations represent a real-world area and are produced using three-dimensional radiation transport calculations. The interactive augmented reality systems enable users to identify the intensity of a surrounding radiation environment by audio guidance exclusively, e.g., producing aural sound sensed by a user's hearing to simulate a radiation detector. The interactive augmented reality systems enable users to identify radiation by sight and sound by providing a combination of aural and visual guidance.

The interactive augmented reality systems render an interactive augmented environment. A composite of real and augmented reality objects shows visual aspects of simulated radiation fields. Individual colored layers in the form of isostatic contours, or isocontours, show spatial relationships of pre-selected intensities of radiation, gradients of these intensities, and varying shapes based on real-world empirical shielding and scattering effects of the simulated radiation fields. In some implementations, the colored zones or segments of the isocontours represent surfaces of constant radiation intensity ranges that are superimposed into users' vision of the user's real-world local environment. The isocontours allow users to see three-dimensional hologram representations of radiation fields that are near and remote to them and the simulated radiation intensity levels that appear to be radiating from the real-world objects.

The interactive augmented reality systems simulate real-world radioactive environments with visual aspects, provide real-time feedback, record a user's actual activities, record a user's actual behaviors, record simulated radiation exposure rates superimposed onto the real-world representations, record the user's interactions—with or exposure—to these simulated radiation levels, etc., and/or provide a user's assessments that include images that grab participant and analyst's attention, enhance user's comprehension, and improve users' recall by their high resolution effects. Data from actual use cases are cataloged, analyzed, and/or referenced in some of the interactive augmented reality systems providing users with easy access to performance logs, dose reports, post-processing and performance analysis. The interactive augmented reality systems communicate visual and spatial radiation data mined from the user's experience to local and/or remote sites. The visual and spatial radiation data is provided in real-time during the user's experience to remote users, and to local and/or remote users such as radiological training personnel, occupational personnel, or instructors, for example. Storing and analyzing data is extremely useful for providing real-time training, for monitoring, for understanding the complex relationships between sensory input and behavior, mitigating radiation exposure rates, for reducing radiation exposure levels, improving worker awareness, and/or for reducing liability.

I. Examples of Technologies for Interacting with Simulated Radiation Data Using Augmented Reality FIG. 1(a) is a diagram of an example of a system 50 for interacting with simulated radiation data using augmented reality. The system 50 includes an augmented-reality device 22. The augmented-reality device 22 is suitably an augmented-reality headset 22A, a smart phone 22B, or a tablet 22C, for instance. The augmented-reality devices 22, 22A, 22B, 22C, etc., of the system 50 are communicatively coupled with each other through a communications network 59. The communications network 59 uses one or more data network protocols and includes private or public subnetworks. In some implementations, the communications network 59 is implemented as one or more of a communications bus, a Wi-Fi network, or a cellular-data network. In some implementations, the one or more augmented-reality devices 22, 22A, 22B, 22C include at least a portion of the communications network 59.

Additionally, the augmented-reality devices 22, 22A, 22B, 22C are communicatively coupled with one or more data stores 56A, 56B, 56C, 56D, etc., through network 59. In some implementations, the system 50 includes at least some of the data stores 56A, 56B, 56C, 56D, e.g., as part of a data storage system. In some implementations, the augmented-reality devices 22, 22A, 22B, 22C include at least some of the data stores 56A, 56B, 56C, 56D, e.g., as part of memory devices, hard drives, etc.

In the example shown in FIG. 1(a), the augmented-reality device 22 includes controlling means 51, tracking means 52, viewing means 53, and a user interface 54. In some implementations, the controlling means 51 includes one or more microprocessors configured as a central processing unit (CPU) and/or a graphic processing unit (GPU), each having one or more cores. Further, the some of the controlling means 51 include local and remote memory. Furthermore, some of the controlling means 51 include communications circuitry that communicates over the communications network 59.

In some implementations, the tracking means 52 includes one or more of visible-light sensors, IR-light sensors, RF sensors, or LiDAR. Such sensors function independently and/or in conjunction with each other and/or the controlling means 51 to determine the augmented-reality device 22's physical location in a scene, e.g., a training area. Additionally, the tracking means 52 includes one or more of accelerometers, gyroscopes, magnetometers, orientation sensors, global positioning sensors, etc. Since the augmented-reality device 22 is carried by a user immersed in the scene, e.g., a trainee walking through the training area, some of the tracking means 52 use stationary images and/or video images acquired by the onboard sensors and/or by remote sensors to track the user's movements, the user's position, the user's activity. For example, some of the tracking means 52 include one or more of megapixel photographic, e.g., 100 megapixel (MP) or 400 MP Multi-Shot, cameras, or video cameras, e.g., 4K video and 10 frames per second shooting, to record users' visual and aural real-world experiences. In some implementations, the tracking means 52 tracks the user through the scene using additional location data from beacons, global positioning receivers, etc. The tracking means 52 tracks one or more of the user's physical movements, the user's geographic position, the user's physical activity, the user's position relative to objects of the scene, and/or the user's actual behavior as the user physically navigates the scene. On that account, the tracking means 52 conveys the user's interactions with their real-world and augmented environment and communicate those interactions to the controlling means 51.

In some implementations, the viewing means 53 includes one or more display devices that present frames acquired by the cameras of the monitoring means 52. For example, the display devices include waveguide displays with fixed focus lenses and transparent combiner lenses that receive projections and display images. Some of the display devices include OLED displays. In some implementations, the viewing means 53 and the controlling means 51 overlay holograms over a view, or an image, or a portion of a scene in which the user is immersed. Here, different perspective views of the holograms are placed, removed, resized, copied, rotated, resized, interchanged, overlapped and/or produced. In other implementations, the viewing means 53, the controlling means 51, and the tracking means 52 change the views of the holograms to the user, e.g., between a side view, a front view, a rear view, and a top view. The views are positively correlated to the user's physical position and reveal previously unseen portions of the holograms. The perspectives change in response to changes in the relative position and/or relative orientation of a field of view (FOV)

of the viewing means 53 with respect to a reference feature. The viewing means 53 automatically inputs, manipulates, and renders additional three-dimensional views, e.g., some from different perspectives and different sides, of the holograms in response to the user's behavior and/or movement through the space.

In some implementations, the user interface 54 includes one or more of a graphical user interface (GUI), one or more speakers, a haptic interface, or multiple no look input elements and/or switches. In some implementations, the controlling means 51 instruct the speakers to produce audio sound corresponding to the intensity of the simulated radiation at the location of the augmented-reality device 22, e.g., aural sound to be sensed by a user's hearing to simulate a radiation detector. In some implementations, the no look input elements and/or switches adjust display brightness and headset volume. They have different shapes and/or textures so that users recognize them and their associated functions without seeing them. Other no-look input elements and/or switches include power buttons. Further, the user interface 54 includes status indicators, universal serial bus interfaces, physical audio jacks, a hand enabled input device that allows users to enable, scroll, and select GUI menus. The user interface 54 actuates holograms or representations of real-world objects or initiate real-world events.

In the example shown in FIG. 1(a), the data store 56A stores digital representations of respective physical scenes of interest to users of the system 50. Here, each scene $10_i$, where i=1 . . . N and N≥2, is a training area, e.g., room, warehouse, yard, etc., to be explored by a user of one of the augmented-reality devices 22. A digital representation of a scene $10_i$, also referred to herein as a digital scene $11_i$, is a three-dimensional model of the scene $10_i$. In some implementation, the digital scene $11_i$ is a collection of images combined with lines, points and polygons that create three dimensional shapes of certain sizes and/or textures associated with the scene $10_i$. In some implementations, the digital scene $11_i$ is a computer-aided design (CAD) geometry of the scene $10_i$.

In the example shown in FIG. 1(a), the data stores 56B, 56C store simulated radiation data including radiation voxels 31 and source holograms 35, respectively. Here, a set of radiation voxels $31_{ij}$ corresponds to a simulated radioactive source $30_j$ of a particular type being placed at a predetermined location of a scene $10_i$, where j=1 . . . M and M≥2. Additionally, a source hologram $35_j$ corresponds to the simulated radioactive source $30_j$.

Herein, the clause "radiation voxels corresponding to (or associated with) a simulated radioactive source of a particular type placed at a predetermined location of a physical scene" refers to "radiation voxels corresponding to (or associated with) a simulated ionizing radiation field caused as if a radioactive source of a particular type was emitting ionizing radiation from a predetermined location of a physical scene." Particular types of a radioactive source are a gamma source, an X-ray source, a neutron source, a beta source, an alpha source, or any particle-emitting source of ionizing radiation. In general, radiation voxels are suitably determined for any one of known ionizing-radiation sources, as described next.

Figure 1B:
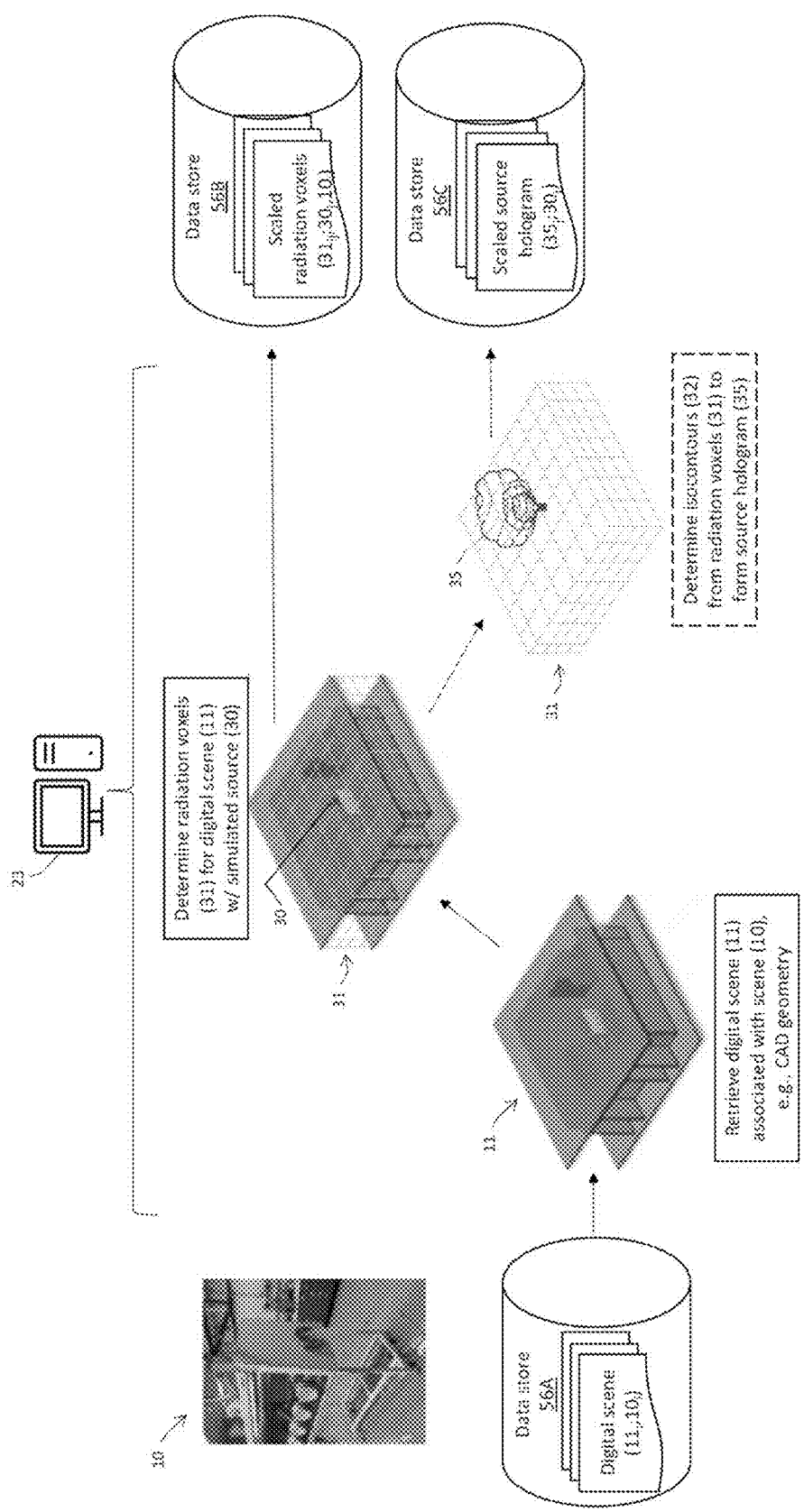
FIG. 1(b) shows an example of a technique for determining simulated radiation data associated with a digital representation of a physical scene and for a simulated radioactive source disposed at a predetermined location of the scene.

FIG. 1(b) shows a technique for determining simulated radiation data, e.g., radiation voxels 31 and a source hologram 35, associated with a digital representation 11 of a physical scene 10 and for a simulated radioactive source 30 of a particular type disposed at a predetermined location of the scene. In some implementations, this technique is performed, by a computer system 23 prior to using the system 50, in the following manner.

The computer system 23 retrieves a digital scene 11 associated with the scene 10, e.g., from the data store 56A. In the example illustrated in FIG. 1(b), the digital scene 11 is a CAD geometry of the scene 10.

Further, the computer system 23 determines radiation voxels 31 corresponding to a simulated radioactive source 30 of a particular type disposed at a predetermined location of the digital scene 11. Here, the computer system 23 uses three-dimensional radiation transport models that are part of comprehensive modeling and simulation software suites. In some implementations, the computer system 23 uses SCALE software, which is a nuclear software suite developed and maintained by Oak Ridge National Laboratory (ORNL) under contract with the U.S. Nuclear Regulatory Commission, U.S. Department of Energy, and the National Nuclear Security Administration. In other implementations, the computer system 23 determines the radiation voxels 31 using other radiation transport codes such as MCNP, GEANT4, PHITS, FLUKA, or any other codebase capable of accurately simulating ionizing radiation. The resulting radiation voxels 31 include a three-dimensional grid of radiation data, e.g., levels of radiation intensity, flux, or dose rates, for the particular type of simulated radioactive source 30 disposed at the predetermined scene location. In some implementations, respective levels of at least some of the radiation voxels 31 are suitably intermixed and/or associated with empirical data, e.g., with real radiation measurement values.

In some implementations, the radiation voxels 31 include customized cuboids. For instance, the radiation voxels 31 breakdown spaces into parallelepipeds or cuboids having dimensions that may vary depending by scene type, by scene region, or by scene usage. The radiation transport models balance processing radiation data at too high of a fidelity by processing small-size radiation voxels that require excessive computational and temporal resources, e.g., by processing too many radiation voxels, against processing large-size radiation voxels that lack fidelity or have such low resolution that they fail to accurately identify transition areas and exposure levels between radiation free areas, low radiation areas, and high radiation areas to human users. Some mesh models and/or radiation transport models are based on and/or modified to represent average anthropometric dimensions of a human. Moreover, variances of female and male human users are suitably based on radiological industry-accepted response functions.

Since the computer system 23 applies the radiation transport models using constraints associated with the digital scene 11, the resulting radiation voxels 31 exhibit multiple properties. One property establishes radiation levels of respective radiation voxels 31 so that they accurately account for the presence of objects within the digital scene 11. Another property sizes the radiation voxels 31 to a common scale with the digital scene 11.

Moreover, the computer system 23 saves, e.g., to the data store 56B, the radiation voxels 31 associated with the scene 10 and the simulated radioactive source 30. The stored radiation voxels 31 are properly scaled in accordance with the digital scene 11.

In some implementations, the computer system 23 uses the radiation voxels 31 to form a source hologram 35 corresponding to the simulated radioactive source 30. This is done by the computer system 23 first identifying spatial relations between voxels of a subset of the voxels 31 that have a given radiation level. For example, the computer system 23 connects the subset's voxels, to determine an isocontour corresponding to the given radiation level. Additional isocontours corresponding to respective other radiation levels are then determined by the computer system 23 in a similar manner. Next, the computer system 23 produces a source hologram 35 from the determined isocontours. In another example, the computer system 23 identifies the spatial relations between voxels of subsets of the voxels 31 having respective common radiation levels using point-clouds instead of isocontours. Because the radiation voxels 31 that were used to produce the source hologram 35 are scaled to the digital scene 11, the source hologram 35 also is properly scaled and aligned to the digital scene 11.

Moreover, the computer system 23 saves, e.g., to the data store 56C, the source hologram 35 associated with the simulated radioactive source 30. The stored source hologram 35 is used by the system 50 to augment reality with a spatial representation of radiation emitted by the simulated radioactive source 30 within the scene 10.

During operation of an augmented-reality device 22, a digital scene 11 retrieved from the data store 56A is suitably used to rescale radiation data retrieved from data stores 56B, 56C to ensure that the stored radiation data is appropriately oriented and aligned to a "live" view of a physical scene, as described next.

Figure 1C:
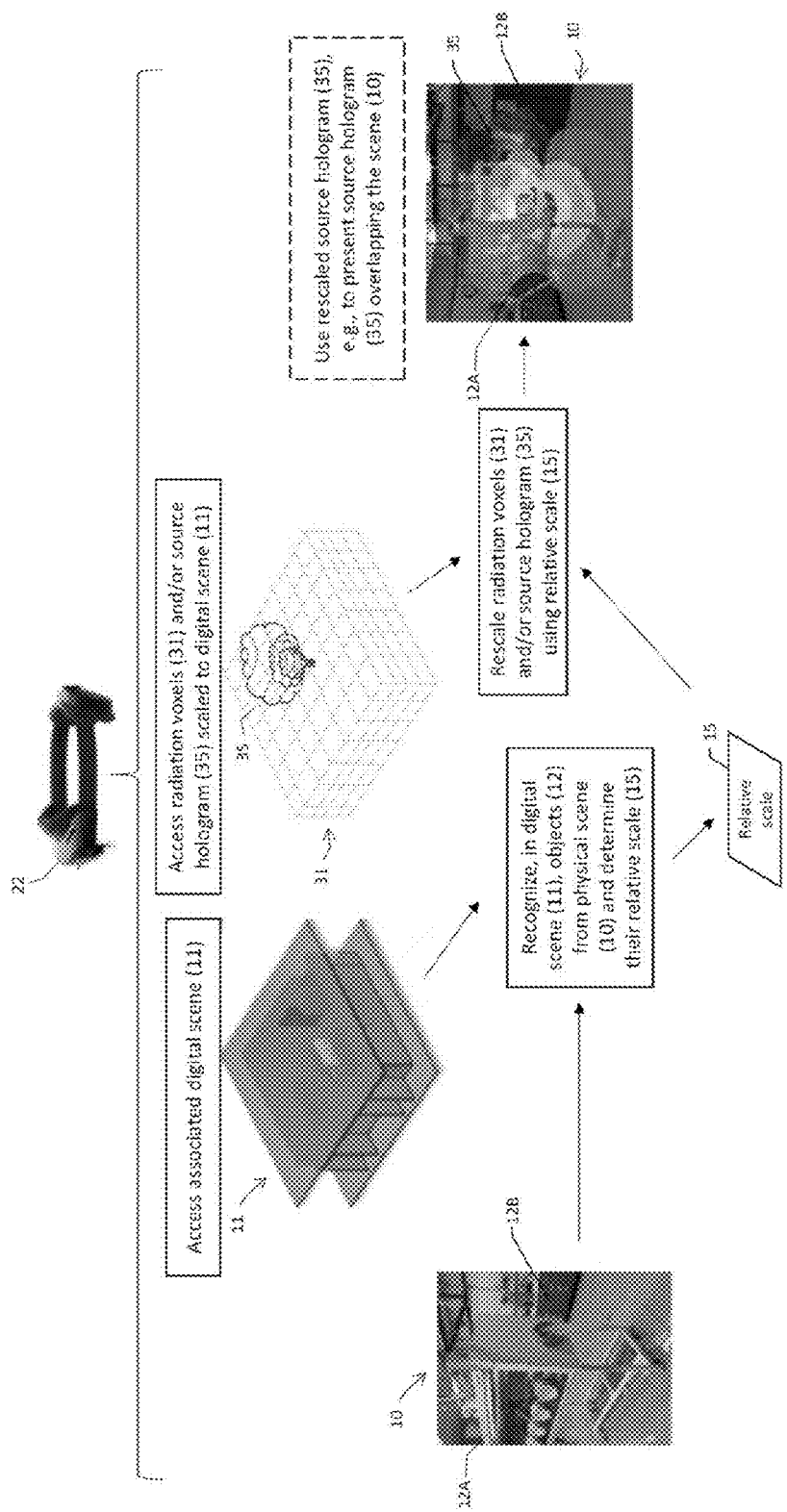
FIG. 1(c) shows an example of a technique for rescaling simulated radiation data to a view of a physical scene.

FIG. 1(c) shows an example of a technique for rescaling simulated radiation data, e.g., radiation voxels 31 and/or a source hologram 35, to an instant view of a physical scene 10. In this example, the technique is performed by an augmented-reality device 22 worn or used by a user immersed in the scene 10.

While the augmented-reality device 22 presents a view of the scene 10 that includes one or more objects 12A, 12B, the augmented-reality device 22 accesses a digital scene 11 associated with the scene 10. Once it recognizes, in the digital scene 11, the objects 12A, 12B from the view of scene 10, the augmented-reality device 22 determines the object's relative scale 15.

In some implementations, the augmented-reality device 22 uses a real-world marker-based system, such as QR codes or fiducials, to align and scale the digital scene 11 to the real-world physical scene 10 to appropriately position hologram(s) into the user's vision of the real-world space. Using images of quick recognition markers attached to or associated with the real-world physical objects, e.g., 12A, 12B, as captured by a camera in the real physical space 10, the augmented-reality device 22 links and associates the physical objects 12A, 12B and optionally their geographic locations in the real-world 10 to their counterparts and their respective locations in the digital scene 11. In other implementations, markers encode and convey other information, such as names of the physical objects 12A, 12B, their locations, the shielding effect of the real-world area 10, incident radiation levels in those areas, etc.

Further, the augmented-reality device 22 also access radiation voxels 31 and optionally a source hologram 35. As described above in connection with FIG. 1(b), the accessed radiation voxels 31 and source hologram 35 are scaled to the digital scene 11 associated with the scene 10.

For that reason, the augmented-reality device 22 uses the determined relative scale 15 to rescale the radiation voxels 31. The rescaling enables the augmented-reality device 22 to accurately monitor, using a subset of the appropriately rescaled radiation voxels, simulated radiation to which the user is exposed while being immersed in the scene 10. Here, the radiation voxels of the subset correspond to a user's path through the scene 10, as described in detail in connection with FIGS. 2(a).

In some implementations, the augmented-reality device 22 uses the determined relative scale 15 to rescale the source hologram 35. The rescaling enables the augmented-reality device 22 to accurately present the rescaled source hologram overlapping the instant view of the physical scene 10.

In some implementations, the augmented-reality device 22 layers the source hologram 35 with a view of the physical scene 10 using a layer mask. Further, it adjusts the digital scene 11 through a wrap function that adds or removes objects 12A, 12B using a clone stamp, and in some implementations, adjusts the colors and/or tones. In some use cases, the augmented-reality device 22 adds portions of an opaque object of the digital scene 11 to hide portions of the source hologram 35 that would be hidden by the opaque object in the view of the live scene 10. For example, the augmented-reality device 22 suitably uses one or more software suites such as Blender®, Paraview®, Unity®, or Unreal Engine™ to perform various operations of a three-dimensional augmented reality model pipeline that includes rendering, compositing, and motion tracking.

The augmented-reality device 22 accurately places detailed contoured source holograms 35 within and/or near the user's view of the user's real-world physical surroundings 10. Some source holograms 35 include multicolored isocontours that correspond to different simulated radiation intensity levels while others use a point-cloud method of visualization. Additionally, the augmented-reality device 22 predicts with a high degree of certainty when, where, and at what intensities of the radiation users would be exposed to if the simulated radioactive sources 30 were real. As users move through a room the augmented-reality device 22 monitors user's exposure rates 65, for a particular type of simulated radioactive source 30 disposed at a predetermined location in the room 10. Here, the augmented-reality device 22 suitably paints a path hologram, e.g., a heat map showing the simulated radiation levels corresponding to the user's previous locations, the time the user spent in those locations, and the user's accumulated radiation levels. Also, the augmented-reality device 22 stores, e.g., to the data store 56D, these events 65 with the user's spatial activities and associated with a temporal timeline, e.g., a chronological record of events and user activities by hours, minutes, seconds, day, year, etc.

Examples of use cases of the technologies for interacting with simulated radiation data are described below in connection with FIG. 2(a), FIG. 3(a), and FIG. 4(a). In each of these examples, an augmented-reality device 22 of the system 50 is suitably carried, e.g., held or worn, by a user 5, while the user 5 is immersed in a physical scene 10 that includes multiple objects 12A, 12B. The augmented-reality device 22 accesses radiation voxels 31 corresponding to a simulated radioactive source 30 of a particular type that is disposed at a predetermined scene location, e.g., supported on a specific object 12A. As described in connection with FIGS. 1(a)-1(c), each radiation voxel is indicative of a respective level of simulated radiation at the radiation voxel's scene location.

I.a) First Example

Figure 2A:
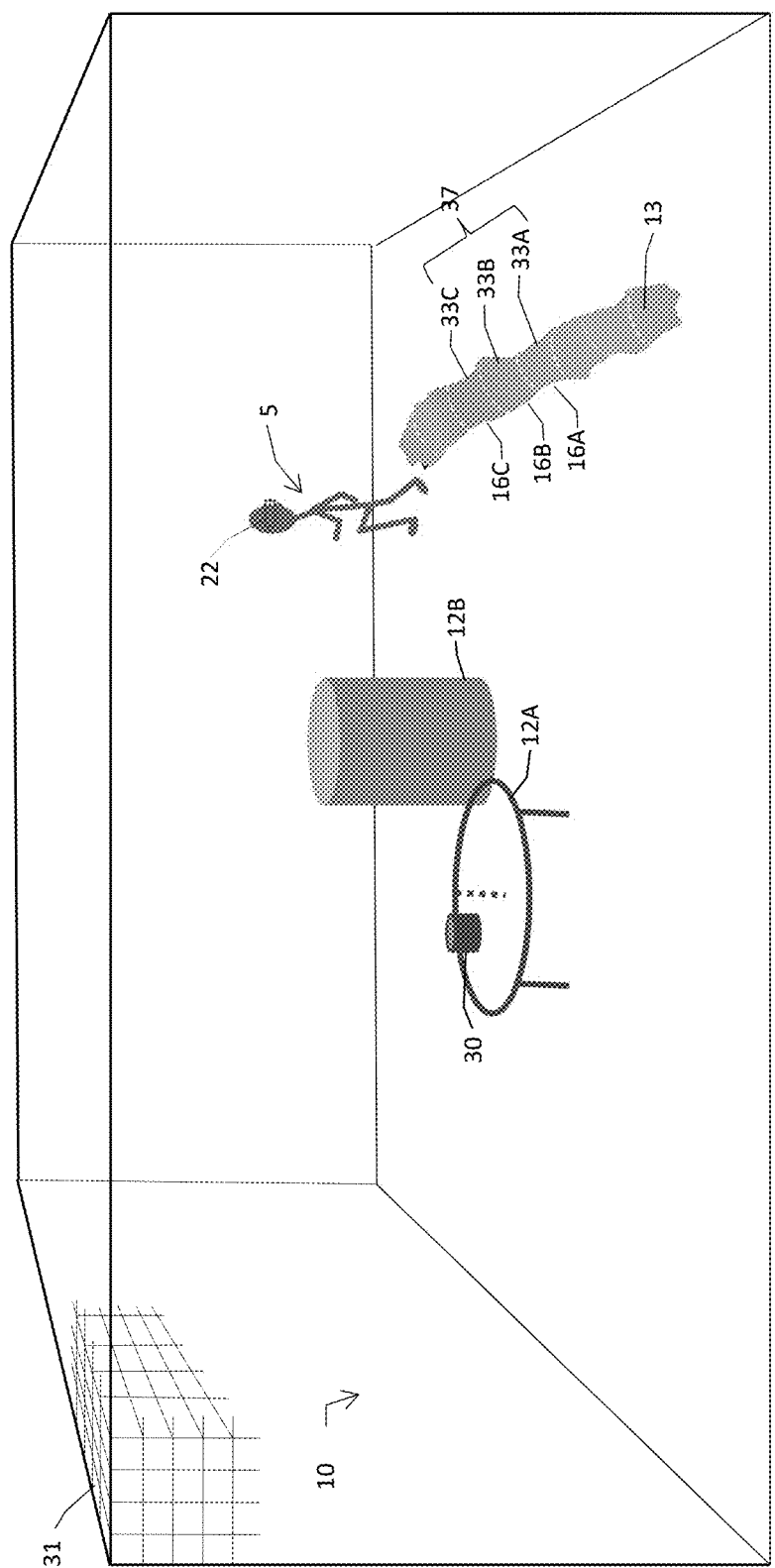
FIG. 2(a) shows a first use case of technologies for interacting with simulated radiation data.
Figure 3A:
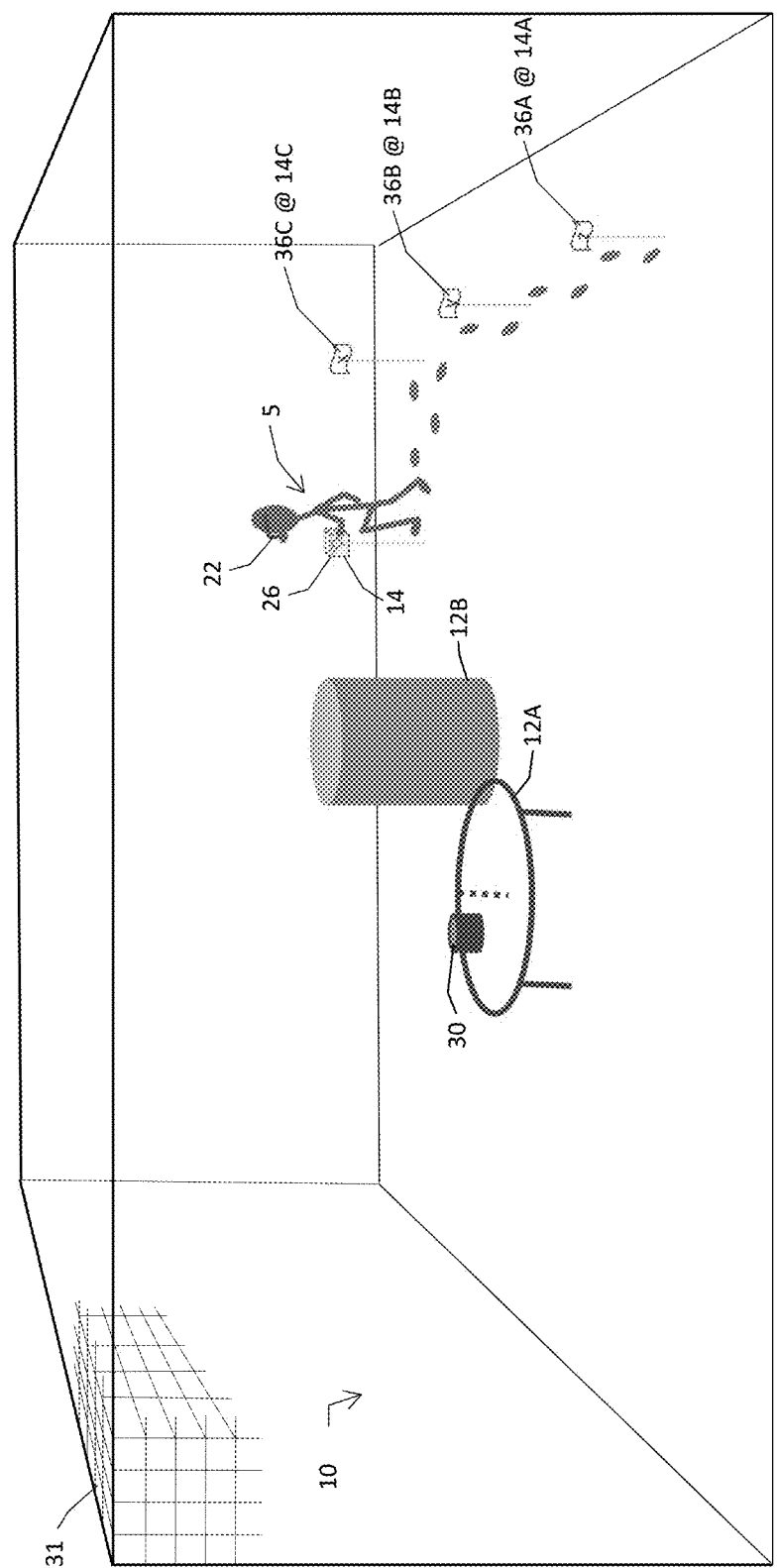
FIG. 3(a) shows a second use case of technologies for interacting with simulated radiation data.

Starting with FIG. 2(a), in a first use case, the augmented-reality device 22 tracks simulated radiation 33 to which the user 5 was exposed along a path 13 taken trough scene 10. Further in this example, the augmented-reality device 22 suitably augments reality by presenting a simulated-radiation path hologram 37, so the user 5 visualizes his or her simulated radiation exposure 33 along the path 13.

Figure 2B:
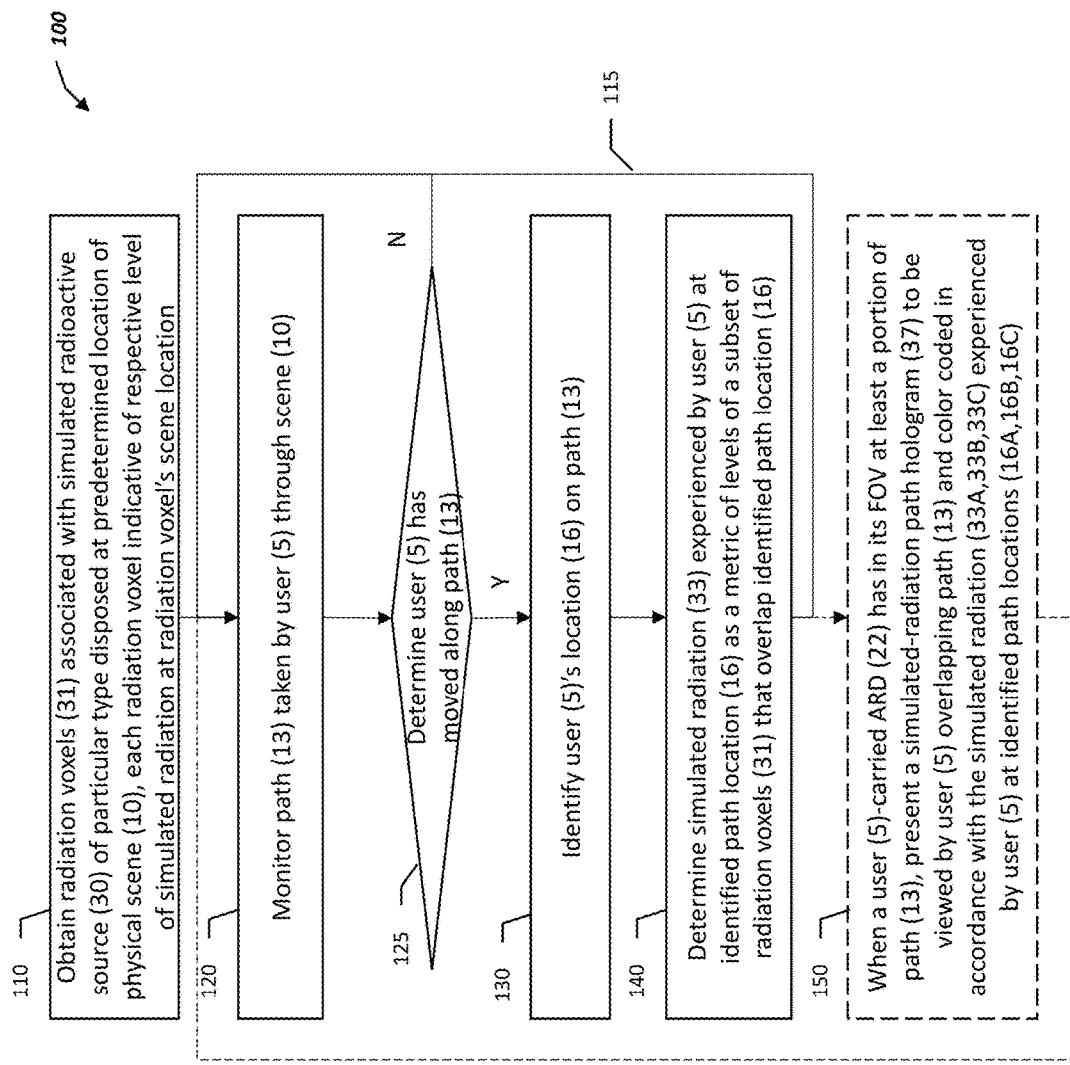
FIGS. 2(b)-2(d) are flowcharts of techniques for performing the first use case.
Figures 2C, 2D:
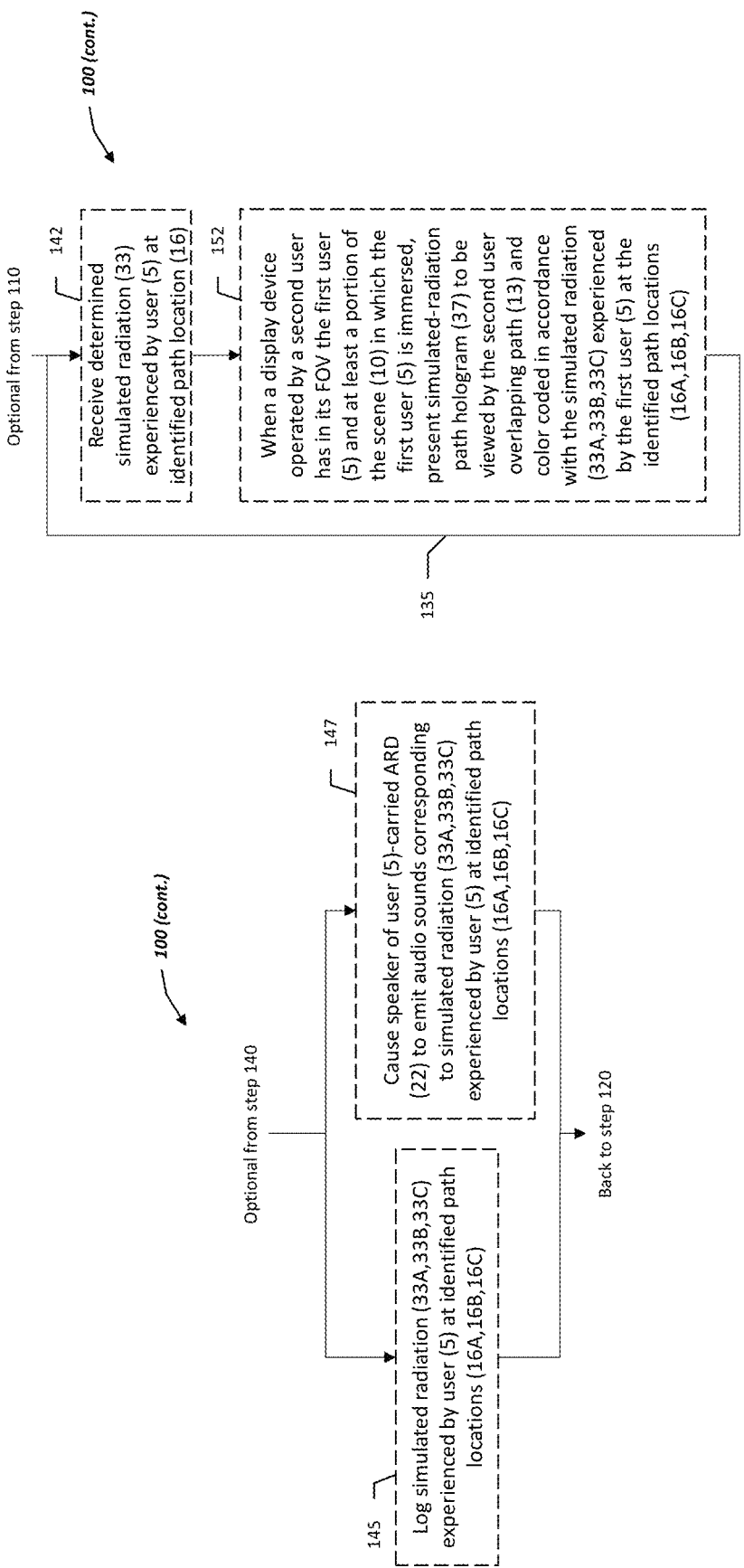

FIGS. 2(b)-2(d) are flowcharts of a first method 100 for interacting with simulated radiation data. The method 100 is performed by one or more of the augmented-reality devices 22, 22A, 22B, 22C of system 50. The method 100 includes the following operations.

Referring to FIG. 2(a) and FIG. 2(b), at 110, the controlling means 51 obtains the radiation voxels 31 corresponding to the simulated radioactive source 30 disposed on the object 12A.

At 120, the tracking means 52 monitors the path 13 taken by the user 5 that carries the augmented-reality device 22 through the scene 10. At 125, the tracking means 52 determines whether the user 5 has moved along the path 13. If the user has not moved, the sequence 120, 125 continues until the tracking means 52 determines that the user 5 has moved along the path 13. If the tracking means 52 determines that the user 5 has moved along the path 13, then, at 130, the tracking means 52 identifies the user 5's location 16 on the path 13.

At 140, the controlling means 51 determines simulated radiation 33 experienced by the user 5 at the identified path location 16 as a metric of levels of a subset of the radiation voxels 31 that overlap the identified path location 16. In some implementations, the operation of determining 140 the simulated radiation 33 experienced by the user 5 at the identified path location 16 is suitably performed by averaging the levels of the radiation voxels of the subset. In some other implementations, the operation of determining 140 the simulated radiation 33 experienced by the user 5 at the identified path location 16 is suitably performed by calculating one or more of a maximum, a minimum, a range, or a median of the levels of the radiation voxels of the subset.

Operations 120, 125, 130, and 140 are repeated as part of loop 115 for as long as necessary, e.g., until the tracking means 52 determines that the user 5 is not in the scene 10. On that account, the augmented-reality device 22 tracks the simulated radiation 33A, 33B, 33C experienced by the user 5 at multiple identified path locations 16A, 16B, 16C.

Referring to FIG. 2(c), in some implementations, at 145, the controlling means 51 logs, e.g., to a data store 56D, the simulated radiation 33A, 33B, 33C experienced by the user 5 at the identified path locations 16A, 16B, 16C. Here, the loop 115 includes operations 120, 125, 130, 140, and 145.

In other implementations, at 147, the controlling means 51 transmit instructions to one or more speakers of the user interface 54 to emit audio sounds corresponding to the simulated radiation 33A, 33B, 33C experienced by the user 5 at the identified path locations 16A, 16B, 16C. Further as part of 147, the speakers emit the audio sounds in response to receiving the instructions, e.g., to provide the user 5 carrying the augmented-reality device 22 audio guidance resembling audio feedback provided by a radiation sensor. For instance, the speakers suitably click with a click rate that follows the changes of the simulated radiation 33 experienced by the user 5 at different path locations 16, as determined at 140. Alternatively, the speakers suitably emit a narrow-spectrum audio sound with variable central frequency, such that the central frequency follows the changes of the simulated radiation 33 experienced by the user 5 at different path locations 16, as determined at 140. Here, the loop 115 includes operations 120, 125, 130, 140, and 147.

Referring again to FIG. 2(a) and FIG. 2(b), in some implementations, when the viewing means 53 has in its FOV at least a portion of the path 13, the viewing means 53 suitably presents at 150 a simulated-radiation path hologram 37 so it is viewed by the user 5 overlapping the path 13. Here, the simulated-radiation path hologram 37 is color coded in compliance with the simulated radiation 33A, 33B, 33C experienced by the user 5 at the respective path locations 16A, 16B, 16C. Alternatively, the simulated-radiation path hologram 37 is scaled in size or shape in compliance with the simulated radiation 33A, 33B, 33C experienced by the user 5 at the respective path locations 16A, 16B, 16C. In some implementations, the operation of presenting 150 the simulated-radiation path hologram 37 includes overlaying the simulated-radiation path hologram 37 on a portion of the scene 10's floor corresponding to the portion of the path 13. In some implementations, the operation of presenting 150 the simulated-radiation path hologram 37 is suitably performed in response to the user requesting the simulated-radiation path hologram 37 through the user interface 54. In these implementations, the loop 115 includes operations 120, 125, 130, 140, and 150.

Referring to FIG. 2(d), a second augmented-reality device is operated by a second user. The second augmented-reality device is communicatively coupled with the first augmented-reality device 22 and performs the following operations.

At 142, the second controlling means receives the determined simulated radiation 33 experienced by the user 5 at the identified path location 16.

When the second viewing means has in its FOV the first user 5 and at least a portion of the scene 10 in which the first user 5 is immersed, the second viewing means presents at 152 the simulated-radiation path hologram 37 so it is viewed by the second user overlapping the path 13. Here, the presented simulated-radiation path hologram 37 is color coded in compliance with the simulated radiation 33A, 33B, 33C experienced by the first user 5 at the identified path locations 16A, 16B, 16C.

Operations 142 and 152 are then repeated as part of loop 135 until the second tracking means determines that the user 5 is not in the scene 10.

Figure 2F:
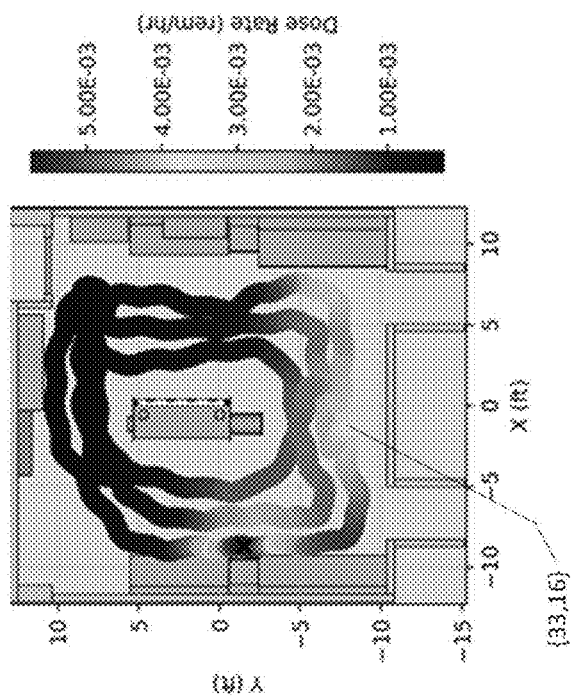
FIGS. 2(e)-2(f) show aspects of the techniques for performing the first use case.
Figure 2E:
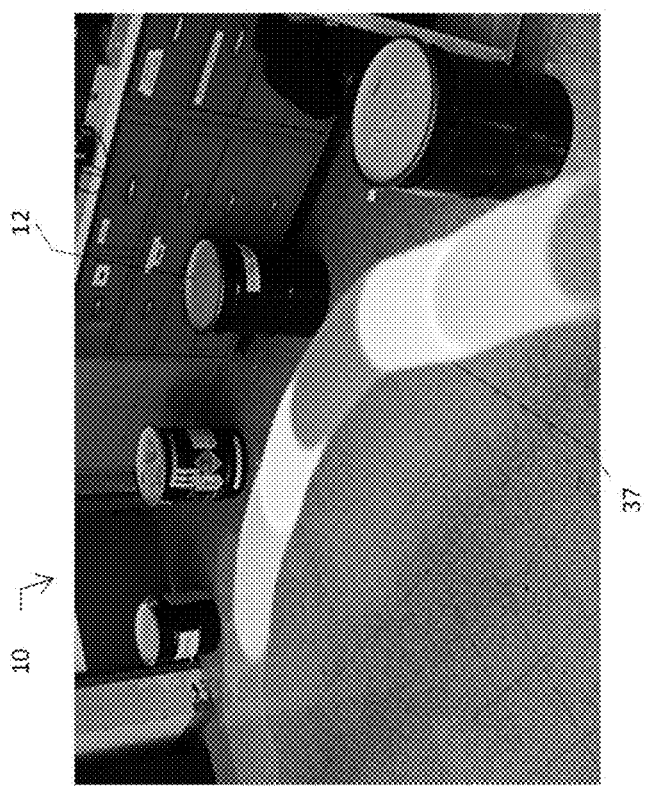

Additional aspects of the first example of the technologies for interacting with simulated radiation data using augmented reality are described below in connection with FIGS. 2(e)-2(f).

An exemplary radiation-source search experience highlights the interactive augmented reality system 50's capability to create and navigate a search environment for unknown locations of radiological objects. A radiation-source search simulates the process of gathering radiological data using a real-time detector. In some implementations of the interactive augmented reality system 50, radiological data is associated with location and timestamps, and the associated data is processed into one or more colormaps of a user's search path 13. In some implementations, the interactive augmented reality system 50 automatically selects from multiple pre-simulated but different augmented reality radioactive sources 30 randomly, that are then randomly placed about a search space 10. In FIG. 2(e), as a user, in this case a participant to the radiation-source search experience, searches for those sources, the user's physical path 13 is painted onto a view of the floor of the search space 10 with various colors indicating the level of simulated radiation exposures in those areas. FIG. 2(e) shows a simulated-radiation path hologram 37 overlaid on the user 5's source search path, color coded to indicate intensity of radiation data. In FIG. 2(e), one of the four buckets 12 holds a simulated radioactive source 30. The color red indicates higher intensities of radiation in the portion of the user's path 13 nearest the highest intensity of radiation fields, the color yellow indicates an intermediate intensity in another portion of the user's path, the light blue color indicates a low intensity in another portion of the user's path, and the dark blue color indicates the lowest intensity in another portion of the user's path.

FIG. 2(*f*) shows an excerpt from a radiological search report produced using the operations described above in connection with FIGS. 2(*b*) and 2(*c*). The radiological search report shown in FIG. 2(*f*) includes the user's entire search path 13, with the highest dose rate marked by an "X". The color mapped trail {33,16} on the floor's representation provides the user with important pieces of information, e.g., locations of where they have/haven't searched, and what the intensity of the radiation was at that location when they were previously there. While the above example of source search supports training an individual in his or her search for radiological sources alone, in other operational applications the system supports multiple users searching larger areas. In some multi-training environments, all users benefit from seeing the other participants' navigation paths. The collective paths are also rendered at remote sites, such as at a command center or training observation center. Some multi-participant source searches execute the operations described in FIGS. 2(*b*) and 2(*d*).

I.b) Second Example

Figure 3B:
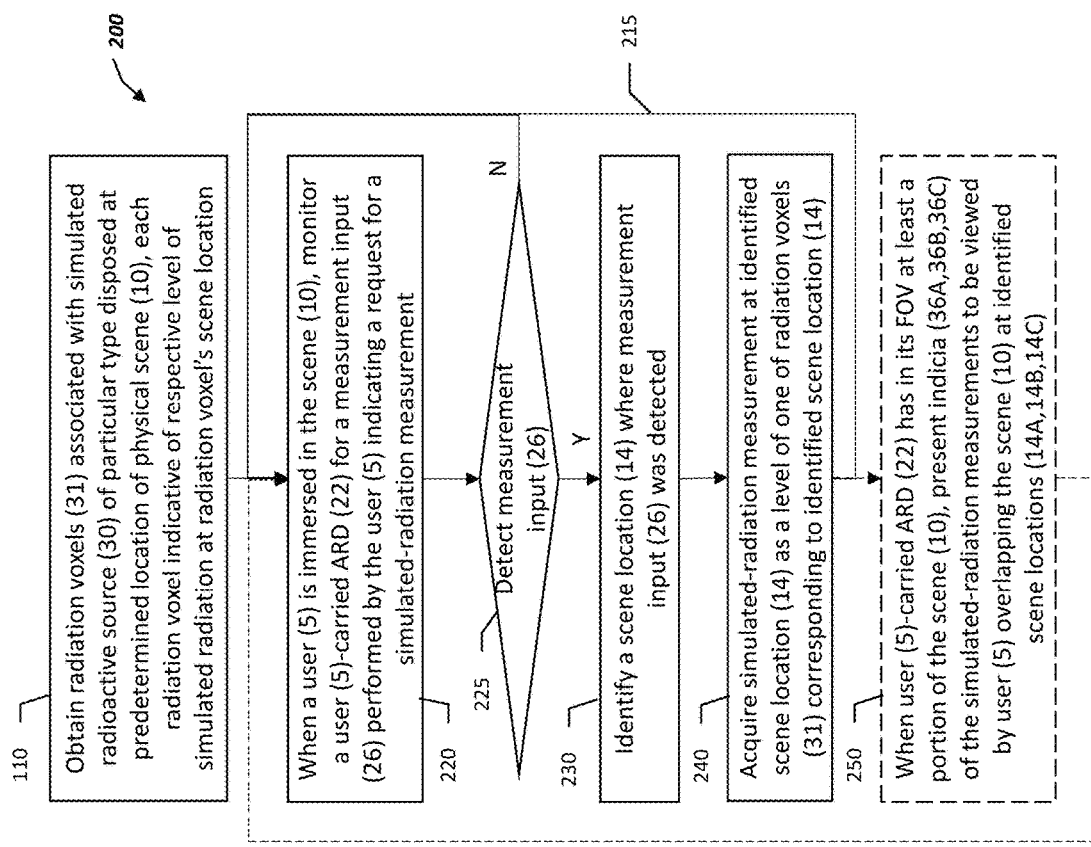
FIGS. 3(b)-3(d) are flowcharts of techniques for performing the second use case.
Figures 3C, 3D:
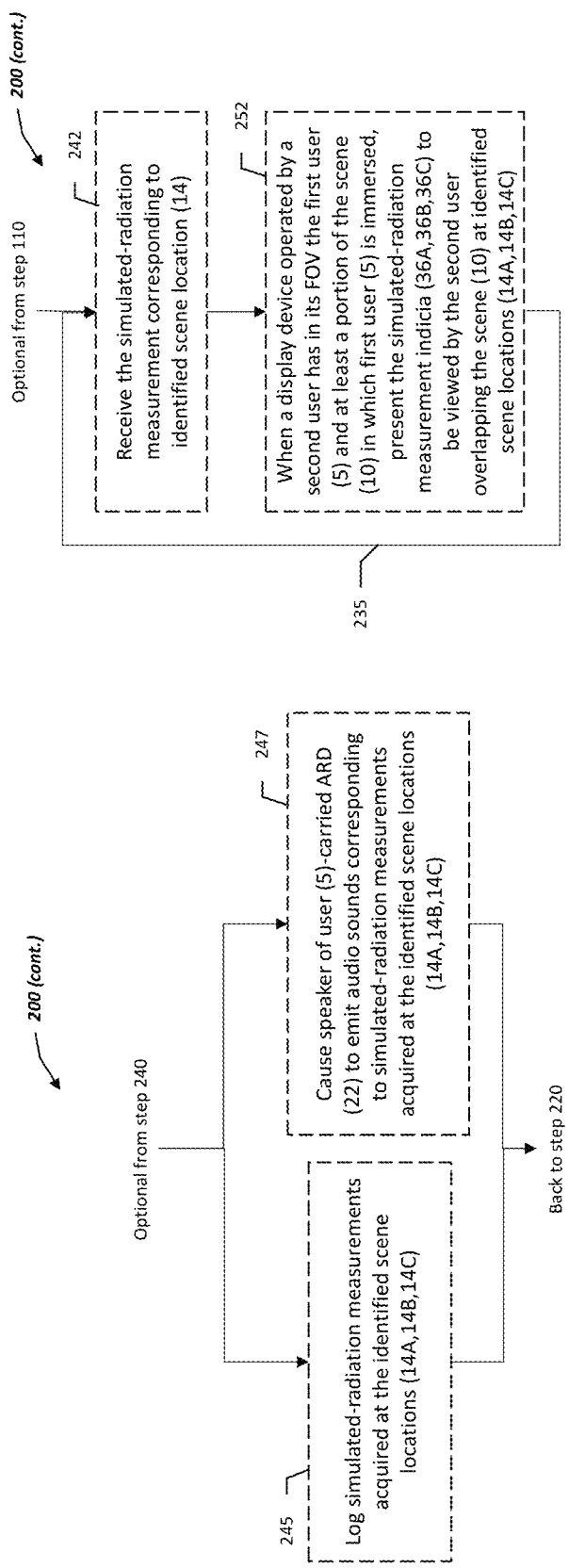

Continuing now to FIG. 3(*a*), in a second use case, the augmented-reality device 22 tracks simulated radiation levels at various locations 14 of the scene 10 indicated by the user 5. Further in this example, the augmented-reality device 22 suitably augments reality by presenting simulated-radiation measurement indicia 36, so the user 5 visualizes the simulated radiation levels at the indicated scene locations 14.

FIGS. 3(*b*)-3(*d*) are flowcharts of a second method 200 for interacting with simulated radiation data. The method 200 is performed by one or more of the augmented-reality devices 22, 22A, 22B, 22C of system 50. The method 200 includes the following operations.

Referring to FIG. 3(*a*) and FIG. 3(*b*), at 110, the controlling means 51 obtains the radiation voxels 31 corresponding to the simulated radioactive source 30 disposed on the object 12A.

At 220, the viewing means 53 monitors for a measurement input 26 performed by a user 5 that carries the augmented-reality device 22 through the scene 10. Here, the measurement input 26 indicates a request for a simulated-radiation measurement. In some implementations, the measurement input 26 includes a user 5's hand gesture within the FOV of the viewing means 53. Here, the hand gesture is an air pinch or a finger snap. In some other implementations, the measurement input 26 is a user 5's hand gesture contacting a haptic display of the viewing means 53. The contacting hand gesture may be one of one or more tap gestures, one or more swipe gestures, a pinch gesture, or a reverse pinch gesture, for example.

At 225, the viewing means 53 detects whether the user 5 has performed the measurement input 26. If the viewing means 53 does not detect the measurement input 26, the sequence 220 and 225 continues until the viewing means 53 detects the measurement input 26. If the viewing means 53 detects the measurement input 26, then, at 230, the tracking means 52 identifies a scene location 14 where the measurement input 26 was detected.

At 240, the controlling means 51 acquires, at the identified scene location 14, the simulated-radiation measurement as a level of one of the radiation voxels 31 that corresponds to the identified scene location 14.

Operations 220, 225, 230, and 240 are repeated as part of loop 215 until the tracking means 52 determines that the user 5 is not in the scene 10. On that account, the augmented-reality device 22 tracks the simulated radiation measurements at multiple scene locations 14A, 14B, 14C.

Referring to FIG. 3(*c*), in some implementations, at 245, the controlling means 51 logs, e.g., to a data store 56D, the simulated radiation measurements acquired at the identified scene locations 14A, 14B, 14C. Here, the loop 215 includes operations 220, 225, 230, 240, and 245.

In other implementations, at 247, the controlling means 51 transmit instructions to one or more speakers of the user interface 54 to emit audio sounds corresponding to the simulated-radiation measurements acquired at the identified scene locations 14A, 14B, 14C. Further as part of 247, the speakers emit the audio sounds in response to receiving the instructions, e.g., to provide the user 5 carrying the augmented-reality device 22 audio guidance resembling audio feedback provided by a radiation sensor. For instance, the speakers suitably click with a click rate that follows the changes of the simulated-radiation measurements, as acquired at 240, at different scene locations 14. Alternatively, the speakers suitably emit a narrow-spectrum audio sound with variable central frequency, such that the central frequency follows the changes of the simulated-radiation measurements, as acquired at 240, at different scene locations 14. Here, the loop 215 includes operations 220, 225, 230, 240, and 247.

Referring again to FIG. 3(*a*) and FIG. 3(*b*), in some implementations, when the viewing means 53 has in its FOV at least a portion of the scene 10, the viewing means 53 suitably presents at 250 indicia 36A, 36B, 36C of the simulated-radiation measurements so they are viewed by the user 5 overlapping the scene 10 at the identified scene locations 14A, 14B, 14C. In some implementations, each of the simulated-radiation measurement indicia 36 is a label, a symbol, or a color-coded marker. In some implementations, the operation of presenting 250 the simulated-radiation measurement indicia 36A, 36B, 36C is suitably performed in response to a user requesting the simulated-radiation measurement indicia 36A, 36B, 36C through the user interface 54. In these implementations, the loop 215 includes operations 220, 225, 230, 240, and 250.

Referring to FIG. 3(*d*), a second augmented-reality device is operated by a second user. The second augmented-reality device is communicatively coupled with the first augmented-reality device 22 and performs the following operations.

At 242, the second controlling means receives the simulated-radiation measurement acquired at the identified scene location 14.

When the second viewing means has in its FOV the first user 5 and at least a portion of the scene 10 in which the first user 5 is immersed, the second viewing means presents at 252 the simulated-radiation measurement indicia 36A, 36B, 36C so they are viewed by the second user overlapping the scene 10 at the identified scene locations 14A, 14B, 14C.

Operations 242 and 252 are then repeated as part of loop 235 until the second tracking means determines that the user 5 is not in the scene 10.

Additional aspects of the second example of the technologies for interacting with simulated radiation data using augmented reality are described below in connection with FIGS. 3(e)-3(h). This radiological survey experience allows users to examine environments that have simulated radiological sources.

In FIG. 3(e), the location of a simulated, but not entirely visualized, radioactive source 30 is shown to the user by the radiation symbol visualized in the physical room 10. Here, a user walks freely about the room, extends one or both hands, and performs a gesture 26, such as an exemplary double-pinch gesture by making an exaggerated pinching motion with the user's index finger and thumb. The double-pinch gesture represents a "simulated radiation measurement" that is recognized by and associated as such by a headset 22A. The location 14 of user's gesture 26 is marked in three-dimensional space by a yellow augmented reality sphere 36, which may be affixed with an optional label such as a textual label, for example. The optional label may report a simulated radiation measurement at that location, such as representing an air ionization chamber detector's reading (in R/hr), for example. The user is free to take measurements at various times and locations emulating a real-world radiological survey. Marking a measurement in 3D space, is performed using sensor-communication-enabled radiation detectors and augmented reality devices, as described below in connection with FIGS. 8(a)-8(h).

As the survey occurs in the room shown in FIG. 3(f), FIG. 3(g), and FIG. 3(h), the measurement locations are stored in memory, e.g., in real-time or once the survey is completed, and automatically post processed into a radiological survey report. Some examples of survey reports indicate (i) coordinate locations, e.g., listed in X, Y, and Z coordinate plane locations, (ii) time of measurement at those locations, e.g., such as the year, date, hour, minute, seconds, etc., and (iii) dose rates via measurement vectors in an (X,Y)-coordinate plane shown in FIG. 3(h), an (X,Z)-coordinate plane shown in FIG. 3(f), and/or a (Y,Z)-coordinate plane shown in FIG. 3(g) with optional tabulated quantitative values stored for each measurement or vector measurement. Consequently, FIG. 3(f) is an x-z plan view, FIG. 3(g) is a y-z plan view, and FIG. 3(h) is an x-y plan view, respectively, of locations, sequences, and intensities of various simulated radiological measurements stored in a radiological survey report. As shown, the simulated radiological measurements are overlaid in multiple projections over a representation of the physical survey space.

Thus, the radiological survey simulates taking real detector measurements at free and/or pre-designed locations. Data from those simulated exercises is suitably cataloged, analyzed, referenced. The analysis is processed to adjust and/or evaluate core practices, assess core competency, and adjust operating practices.

I.c) Third Example

Figure 4A:
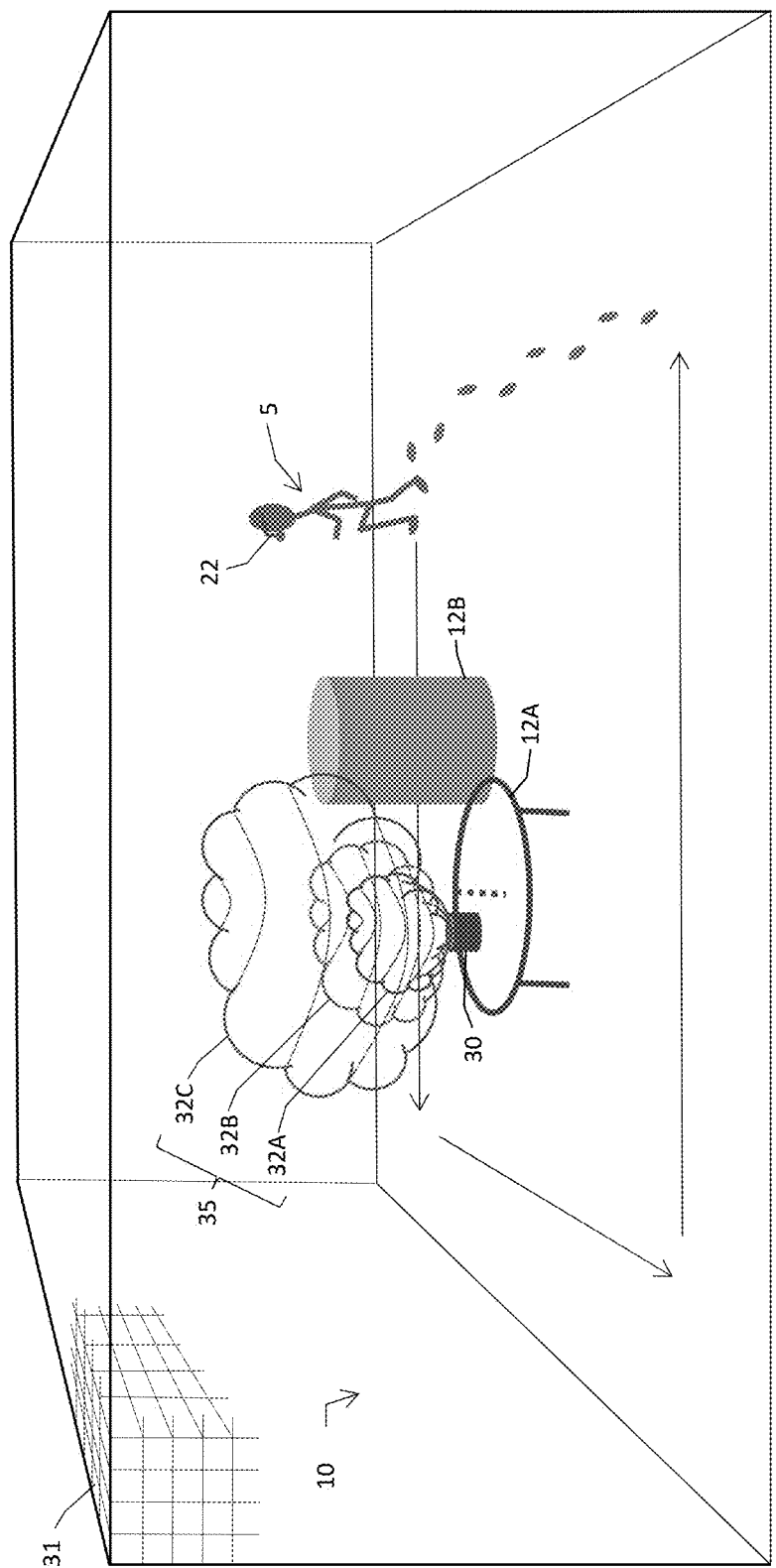
FIG. 4(a) shows a third use case of technologies for interacting with simulated radiation data.

Continuing now to FIG. 4(a), in a third use case, the augmented-reality device 22 augments reality by presenting a source hologram 35, so the user 5 moves through the scene around the simulated radioactive source 30.

Figure 4B:
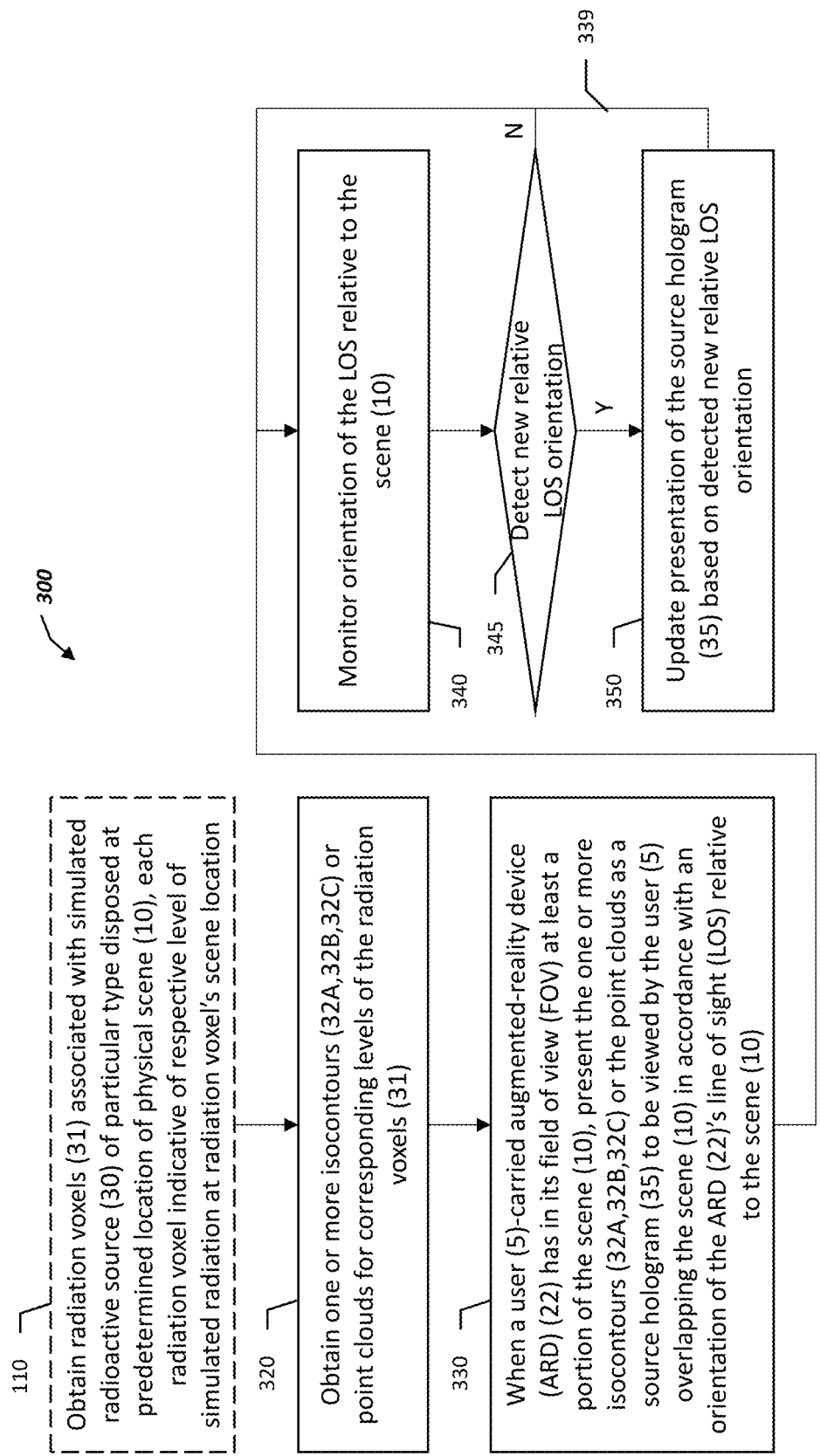
FIGS. 4(b)-4(d) are flowcharts of techniques for performing the third use case.
Figures 4C, 4D:
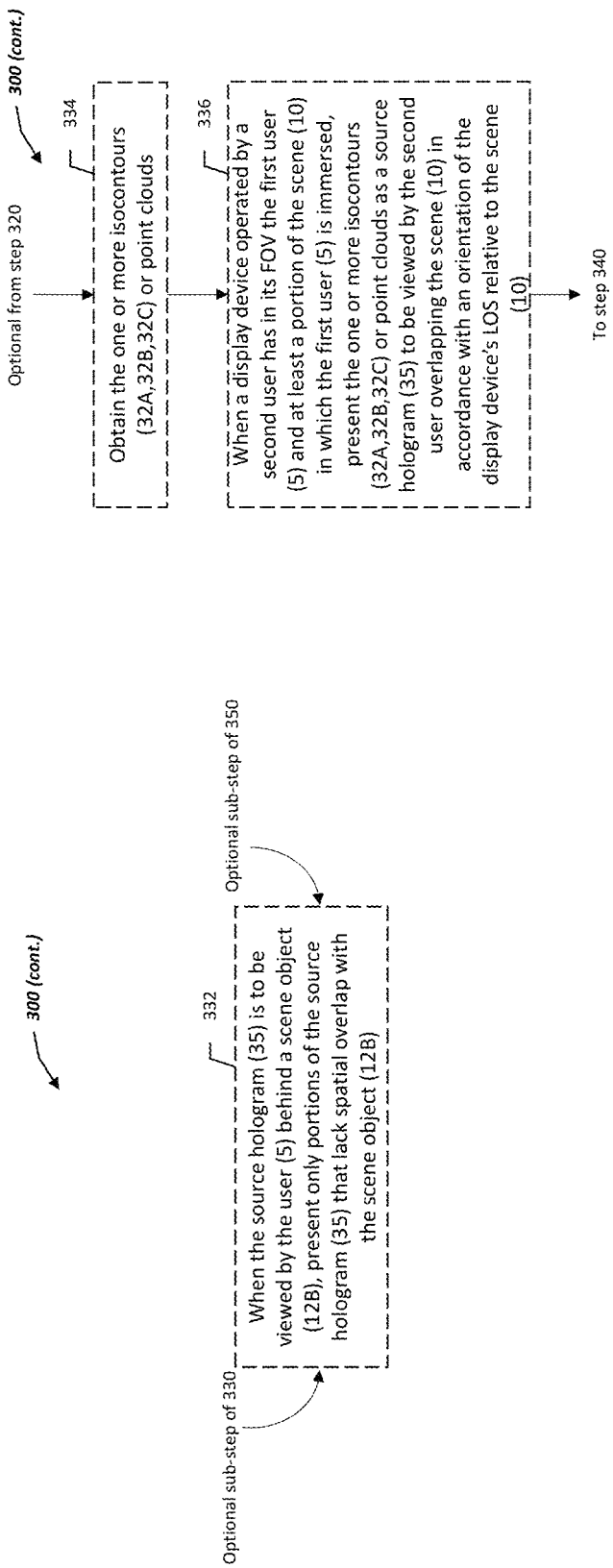

FIGS. 4(b)-4(d) are flowcharts of a third method 300 for interacting with simulated radiation data. The method 300 is performed by one or more of the augmented-reality devices 22, 22A, 22B, 22C of the system 50. The method 300 includes the following operations.

Referring to FIG. 4(a) and FIG. 4(b), at 320, the controlling means 51 obtains one or more isocontours 32A, 32B, 32C for corresponding levels of the radiation voxels 31. Alternatively, point clouds for corresponding levels of the radiation voxels 31 are suitably obtained. The radiation voxels 31 are associated with the simulated radioactive source 30 disposed on the object 12A. In some implementations, the controlling means 51 suitably retrieves one or more precalculated isocontours 32A, 32B, 32C or point clouds that are stored in the data storage 56C. In other implementations, the controlling means 51 retrieves, at 110, the radiation voxels 31 from the data storage 56B, and determines the one or more isocontours 32A, 32B, 32C or the point clouds using the retrieved radiation voxels 31.

At 330, when the viewing means 53 of the augmented-reality device 22 has at least a portion of the scene 10 in its FOV, the viewing means 53 presents the one or more isocontours 32A, 32B, 32C or the point clouds so they are viewed by a user 5 as a source hologram 35 overlapping the scene 10. The view complies with an orientation of the viewing means 53' line of sight (LOS) relative to the scene 10.

At 340, the tracking means 52 monitors orientation of the LOS relative to the scene 10. At 345, the tracking means 52 detects whether the relative orientation of the LOS is new. If it is not new, the sequence 340 and 345 continues until the tracking means 52 detects a new LOS relative orientation. If the tracking means 52 detects a new LOS relative orientation, then, at 350, the viewing means 53 updates the source hologram 35's presentation based on the new LOS relative orientation.

Referring now to FIG. 4(c), in some implementations, the viewing means 53 performs each of the operation of presenting 330 the source hologram 35 and the operation of updating 350 the source hologram 35's presentation as prescribed at 332. When the LOS is oriented relative to the scene 10 such that the source hologram 35 is to be viewed by the user 5 behind a scene object 12B, the viewing means 53 presents only portions of the source hologram 35 that do not spatially overlap the scene object 12B. For example, some portions of a digital scene 11 corresponding to the scene 10 is used to obscure portions of the source hologram 35 from showing through real world object 12B in the FOV of the user 5.

Referring again to FIG. 4(a) and FIG. 4(b), in some implementations, the viewing means 53 uses the techniques described in connection with FIG. 1(c) to perform either the operation of presenting 330 the source hologram 35 or the operation of updating 350 the source hologram 35's presentation. For example, the controlling means 51 retrieves a digital scene 11 corresponding to the physical scene 10. As described in connection with FIG. 1(b), the digital scene 11 has a common spatial scale with the radiation voxels 31. In some implementations, the digital scene 11 is a 3-dimensional CAD representation of the physical scene 10. Referring again to FIG. 1(c), when the viewing means 53 has in its FOV one or more objects 12A, 12B of the physical scene 10, the tracking means 52 recognizes the corresponding objects of the digital scene 11. The controlling means 51 then determines a relative scale 15 between the physical scene 10's objects 12A, 12B and the corresponding digital scene 11's objects. On that account, the viewing means 53 applies the determined relative scale 15 to perform either the operation of presenting 330 the source hologram 35 or the operation of updating 350 the source hologram 35's presentation.

Operations 340, 345, and 350 are repeated as part of loop 339 until the tracking means 52 determines that the user 5 is not in the scene 10. Thus, the augmented-reality device 22 presents the source hologram 35 viewed by the user 5 overlapping the scene 10.

Referring to FIG. 4(d), a second augmented-reality device is operated by a second user. The second augmented-reality device is communicatively coupled with the first augmented-reality device 22 and performs the following operations.

At 334, the second controlling means obtains the one or more isocontours 32A, 32B, 32C or the point clouds. In some implementations, the second controlling means receives the one or more isocontours 32A, 32B, 32C or the point clouds from the first augmented-reality device 22.

When the second viewing means has in its FOV the first user 5 and at least a portion of the scene 10 in which the first user 5 is immersed, the second viewing means presents at 336 the one or more isocontours 32A, 32B, 32C or the point clouds as the source hologram in the second user's view. The source hologram 35 overlaps the scene 10 in compliance with an orientation of the second viewing means' LOS relative to the scene 10.

Additional aspects of the third example of the technologies for interacting with simulated radiation data using augmented reality are described below in connection with FIGS. 4(e)-4(l).

Figure 4F:
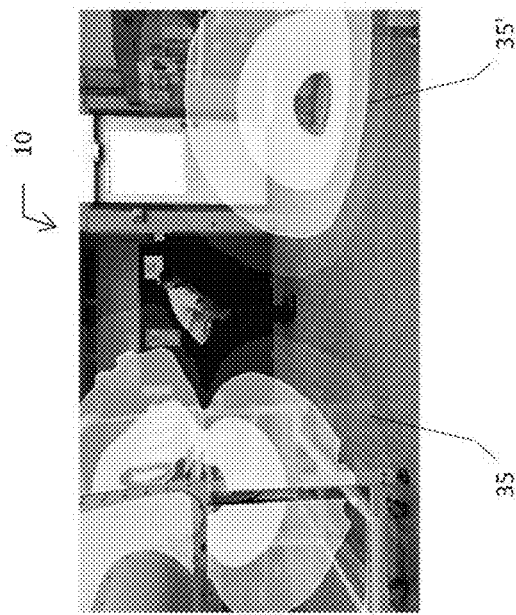
Figure 4E:
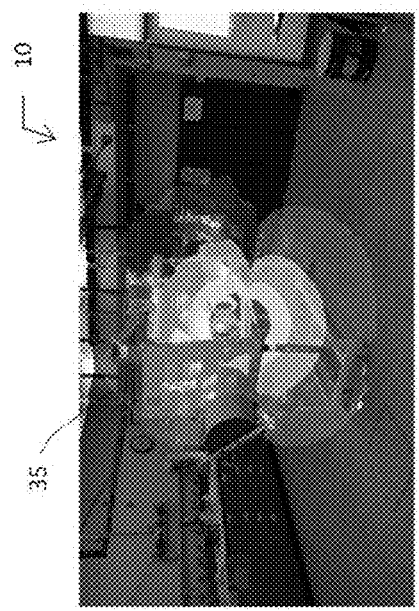

FIG. 4(e) shows a source hologram 35 rendered by the viewing means 53 from precalculated radiation voxels 31 with radiation transport models as described in connection to FIG. 1(b). Each of the colors in the multicolored isocontours that render the source hologram 35 represent different radiation intensity ranges. Mathematically, images of the radiation intensity ranges are generated by assigning colors that correspond to a three-dimensional matrix of radiation values that are mapped across predesignated space. The colors represent radiation dose rate intensity ranges from the one or more radiological transport maps. The appearance of the isocontours, shown as partial spherical portions, spherical triangles, and spherical zones, is precalculated across the distance occupied by the source hologram 35 allowing the entirety or a portion of source hologram 35 to be created, placed, modified, resized, scaled, overlaid, moved, rotated, removed and/or overlap predesignated areas. When placed, the isocontours merge into a substantially smooth visual image, portions of which are designed to be translucent to the real-world object it overlays. The pre-calculations minimize pixel conversion errors that alter colors and translucence variations perceived by human sight. FIG. 4(f) shows a user observing visual sensory input of an optimal path between, and/or around, source holograms 35, 35'. The source holograms 35, 35' include inner and outer contours of varying radiological intensity ranges radiating from two disparate simulated radioactive sources 30, 30' and shows the user a path of least radiation exposure while navigating the scene 10.

Figure 4H:
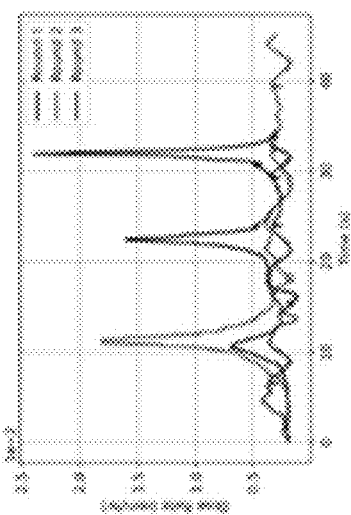
Figure 4I:
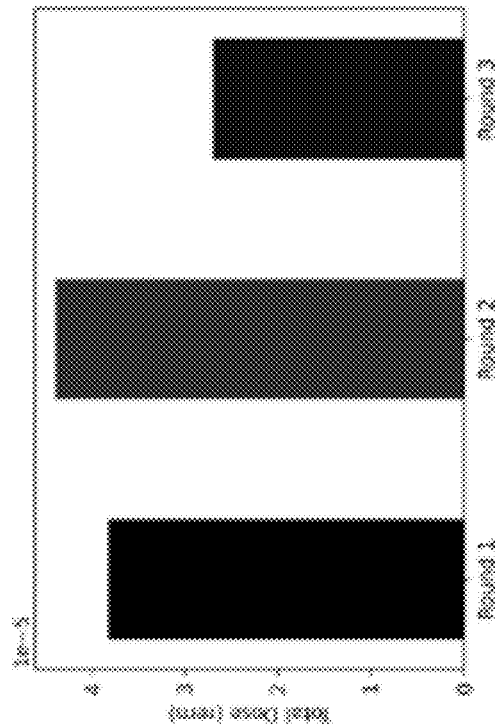
Figure 4G:
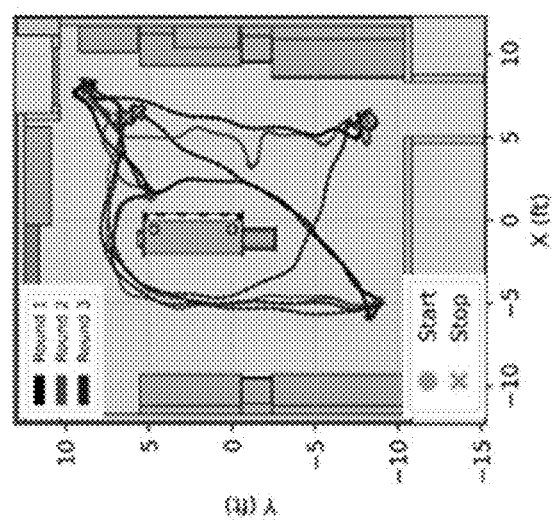

With reference to FIG. 4(g), in another example of a radiological workflow experience, participants navigate through a scene, e.g., a training room, that includes one or more simulated radioactive sources distributed throughout the scene in three separate evaluation rounds to simulate routine and repetitive work in and around elevated radiation fields. In each evaluation round the interactive augmented reality system 50 provides the user with more sensory information about the ambient radiation fields, while the simulated radioactive sources the user navigates remain in their respective locations. The first evaluation round provides no sensory input other than showing the simulated radioactive source locations for participants to navigate. As they navigate the simulated radioactive sources, the participants are walking through pre-simulated, but invisible, radiation fields and their location and speed with respect to the underlying radiation data is recorded. The second evaluation round uses the simulated radioactive source locations and provides audio sensory guidance, such as simulating a Geiger counter's audio output, for example, to detect various simulated radiation levels. As described above in connection with operations 147 or 247, higher frequency aural click rates correspond to higher levels of simulated radiation intensity, and lower frequency aural click rates correspond to lower simulated radiation intensities. The third evaluation round provides the participants with audio guidance and with visual guidance. The visual guidance takes the form of source holograms 35, 35', like the holograms shown in FIGS. 4(e)-4(f).

FIG. 4(g) is x-y plan view of paths over which a participant had no sensory guidance (black path), only audio guidance (red path), and visual and audio guidance (blue path). FIG. 4(h) shows dose rate over the participant's paths illustrated in FIG. 4(g). FIG. 4(i) shows total dose for the participant's paths illustrated in FIG. 4(g). In view of the results shown in FIGS. 4(h)-4(i), the post-processed data from this radiological workflow experience indicates that in a first evaluation round, e.g., in which no sensory guidance was provided, the participant experienced a high simulated integrated radiological dose. During evaluation round two, in which only audio guidance was provided, the participant received a higher simulated radiological dose in part due to the extended time the participant spent navigating and interpreting the uncertain auditory boundaries of the complex and disparate simulated radiological sources. Evaluation round three in which audio and visual guidance were provided, showed the participant being exposed to a lower simulated integrated radiological dose. Evaluation round three enabled the path-of-least-exposure to complete a workflow while enduring the lowest radiological exposure and potentially the shortest temporal exposure. In round three, the safest path through the workflow's simulated radioactive sources is visible outside of the radiation isocontours of the source holograms 35, 35'. FIGS. 4(g)-4(i) show a participant's workflow experiences in an example occupational workflow report.

FIGS. 4(j)-4(l)) show that participants decrease their exposures to ambient radiation fields when they receive holographic representations of their surrounding radiation environments. FIGS. 4(j)-4(l) summarizes radiation exposure when participants are only provided audio cues (red) and when they are provided audio and visual cues (black). FIG. 4(j) shows total dose statistics. FIG. 4(k) shows average dose statistics. FIG. 4(l) shows maximum dose statistics. The vertical span of these box-and-stem plots show consistency of performance. That is data covering a smaller vertical span shows higher consistency, while their horizontal line through the box shows an average consistency. Data with a lower average shows an overall lower radiation exposure. Participants displayed consistent behavior and lower radiation exposures when provided augmented reality visual representations of their ambient radiation environments.

The above radiological workflow experience's post-processed data highlight the benefits radiological workers gain by training with knowledge of the spatial and volumetric characteristics of radiation in a day-to-day working environment. This process repeatedly showed that radiological workers receive a significantly lower total radiological dose for the same series of operations when provided with one or more visual cues of radiation's presence versus audio guidance alone or no guidance.

I.d) Fourth Example

Figure 5:
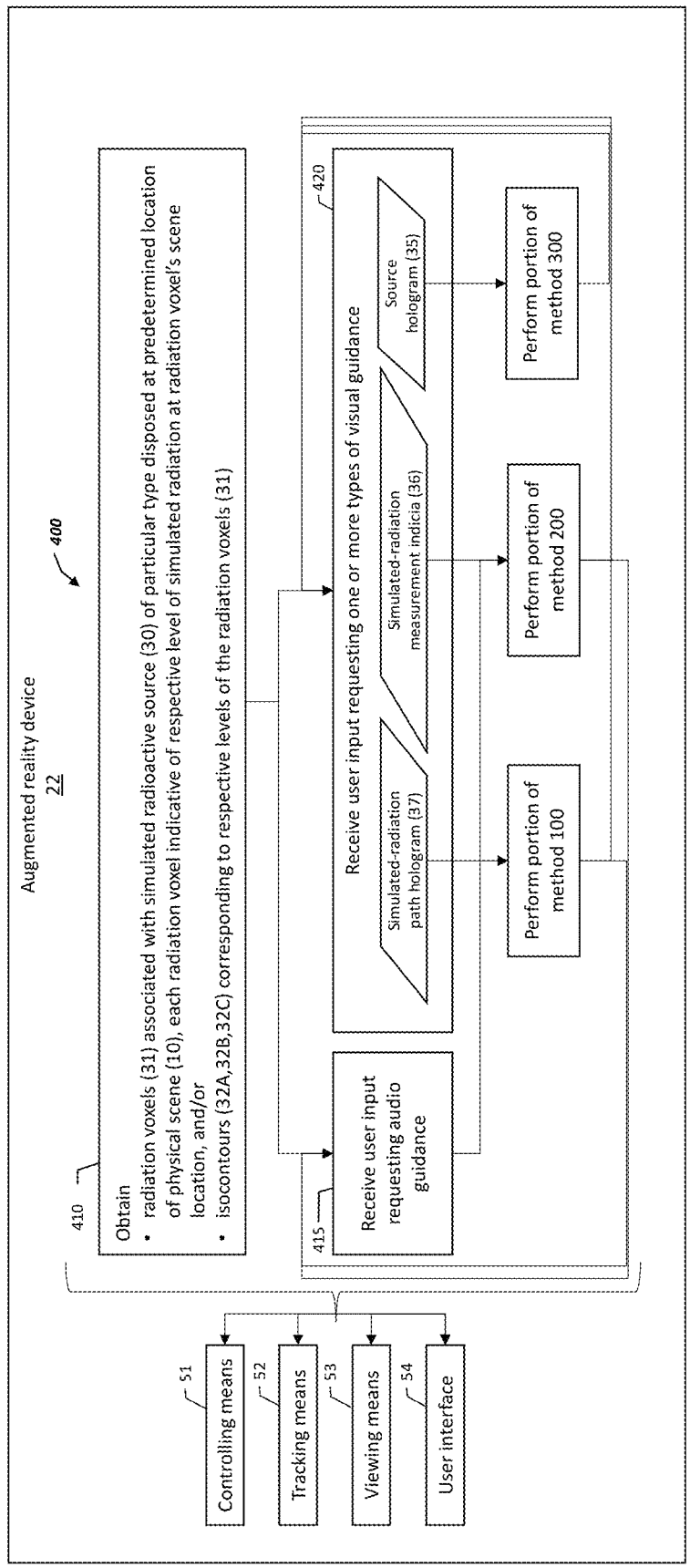
FIG. 5 shows an example of an augmented reality device for performing, based on user input, one or more of the first, second, or third use cases for interacting with simulated radiation data.

FIG. 5 shows a method 400 that operates the augmented reality device 22 based on user input. Here, reality is augmented by providing audio guidance and/or one or more types of visual guidance, e.g., the simulated-radiation path holograms 37, simulated-radiation measurement indicia 36, or source holograms 35. The method 400 includes the following operations.

At 410, the controlling means 51 obtains radiation voxels 31 by performing operation 110 described above in connection with FIG. 2(b) and FIG. 3(b). In some implementations, the operation of obtaining the radiation voxels 31 includes retrieving predetermined radiation voxels from the data storage 56B. In other implementations, the radiation voxels 31 are determined by the controlling means 51 using one or more radiation transport models. At 410, the controlling means 51 also obtains isocontours 32A, 32B, 32C or point clouds corresponding to the radiation voxels 31 by performing operation 320 described above in connection with FIG. 4(b).

At 415, the user interface 54 receives a request to provide audio guidance. In response to receiving at 415 the user 5's input requesting the audio guidance, the augmented reality device 22 performs operations 120, 125, 130, 140, and 147 of method 100, or operations 220, 225, 230, 240, and 247 of method 200.

At 420, the user interface 54 receives one or more requests to provide one or more types of visual guidance, e.g., the simulated-radiation path hologram 37, or the simulated-radiation measurement indicia 36, or the source hologram 35.

In response to receiving at 420 the user 5's input requesting the simulated-radiation path hologram 37, the augmented reality device 22 performs operations 120, 125, 130, 140, and 150 of method 100.

In response to receiving at 420 the user 5's input requesting the simulated-radiation measurement indicia 36, the augmented reality device 22 performs operations 220, 225, 230, 240, and 250 of method 200.

While the augmented reality device 22 executes method 100 or method 200 in response to receiving at 415 the request for audio guidance, the user interface 54 can receive, at 420, an additional request for either the simulated-radiation path hologram 37 or for the simulated-radiation measurement indicia 36. Here, the augmented reality device 22 additionally performs either operation 150 or operation 250.

While the augmented reality device 22 executes method 100 or method 200 in response to receiving at 415 the request for audio guidance or at 420 the request for the simulated-radiation path hologram 37 or for the simulated-radiation measurement indicia 36, the user interface 54 can receive, at 420, an additional request for the source hologram 35. Here, the augmented reality device 22 performs the operations 330, 340, 345, and 350 of method 300 concurrently with performing method 100 or method 200.

The use cases described above are examples of using the system 50 for interacting with simulated radiation data. At least some aspects of the system 50 can be modified to be used for interacting with measured radiation, as described next.

Figure 6:
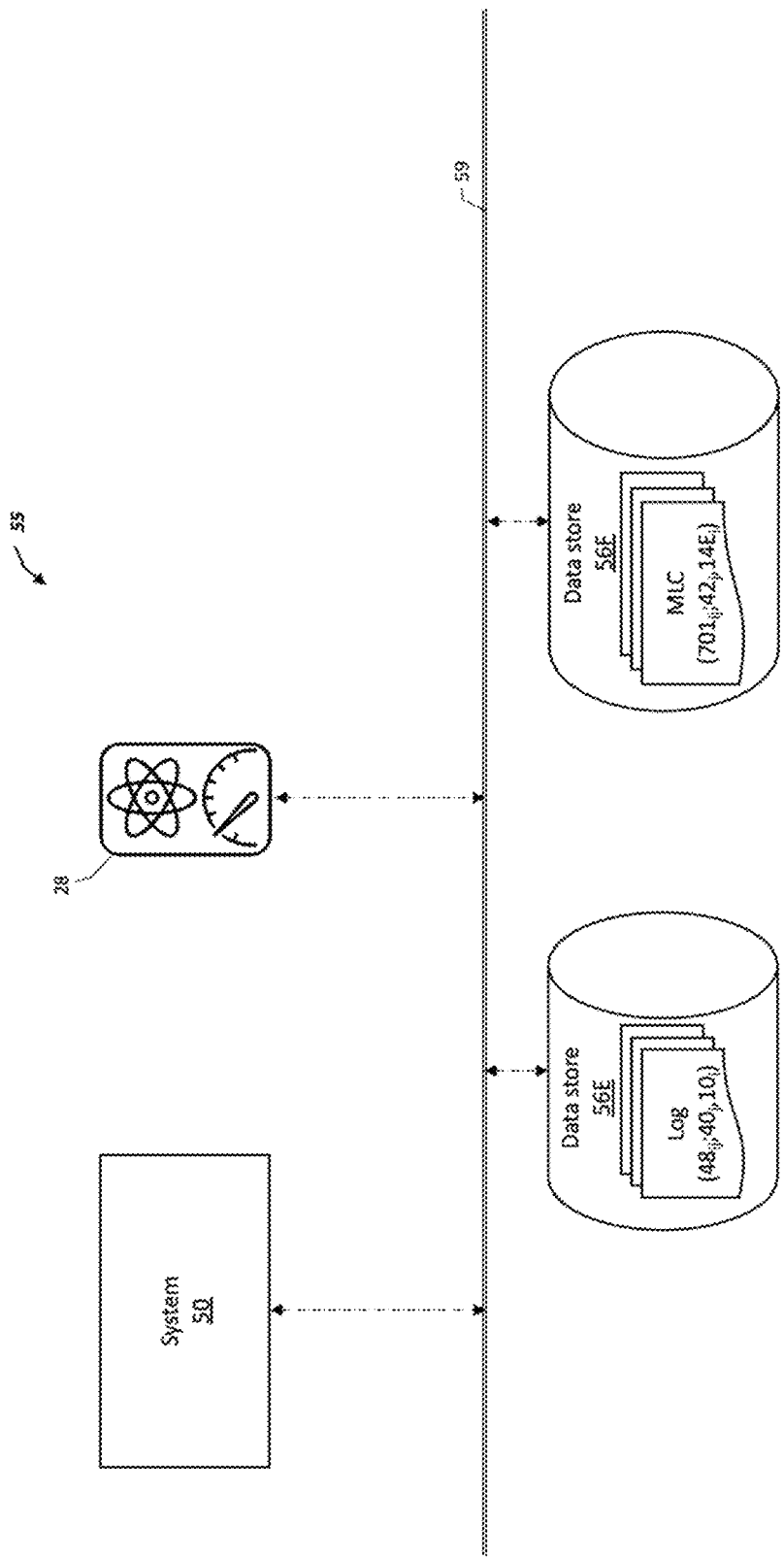
FIG. 6 is a diagram of an example of a system for interacting with measured radiation data using augmented reality.

II. Examples of Technologies for Interacting with Measured Radiation Data Using Augmented Reality FIG. 6 is a diagram of an example of a system 55 for interacting with measured radiation data using augmented reality. The system 55 includes some of the components of system 50. The common components between system 55 and system 50 were described in detail in connection with FIG. 1(a), FIG. 1(b), and FIG. 1(c).

In FIG. 6, the system 55 includes at least one radiation sensor 28 for measuring radiation emitted by one or more real radioactive sources. Here, the radiation sensor 28 couples one or more of the augmented-reality devices 22, 22A, 22B, 22C, etc., of system 50 through the communications network 59. The radiation sensor 28 suitably issues a radiation measurement signal based on an occupational radiation measurement metric that includes one of an air ionization response, an effective dose response, an equivalent dose response, an absorbed dose response, or a count rate. In some implementations, the radiation sensor 28 issues a radiation measurement signal based on air ionization responses. An example of such a radiation detector is a Ludlum 9-4® detector. In other implementations, the radiation sensor 28 issues a radiation measurement signal based on effective dose responses. An example of such a radiation detector is a Bicron MicroRem® detector.

Additionally, the augmented-reality devices 22, 22A, 22B, 22C and the radiation sensor 28 are coupled with one or more additional data stores 56E, 56F, etc., through the communications network 59. In some implementations, the system 55 includes at least some data stores 56E, 56F. In some implementations, the augmented-reality devices 22, 22A, 22B, 22C and/or the radiation sensor 28 include at least some of the data stores 56E, 56F stored on memory devices, hard drives, etc.

Use cases of the technologies for interacting with measured radiation data are described below in connection with FIG. 7(a), FIG. 8(a), and FIG. 9(a). In each of these examples, an augmented-reality device 22 is suitably carried, e.g., held or worn by a user 5, while the user 5 is immersed in a physical scene 10 that includes multiple objects 12A, 12B. Here, the scene 10 includes a real radioactive source 40 disposed at a predetermined scene location, e.g., supported on a specific object 12A. The actual radioactive source 40 has sufficient strength to be measurable while minimizing the radiologically hazards of the source, such as a 12.2 mCi $^{137}$Cs gamma source, for example. The radioactive source 40 is one of a gamma source, an X-ray source, a neutron source, a beta source, an alpha source, or any particle-emitting source of ionizing radiation.

Additionally in the use cases described below, a radiation sensor 28 also is carried by the user 5. Here, the augmented-reality device 22 and the radiation sensor 28 are communicatively coupled to each other.

II.a) First Example

Figure 7A:
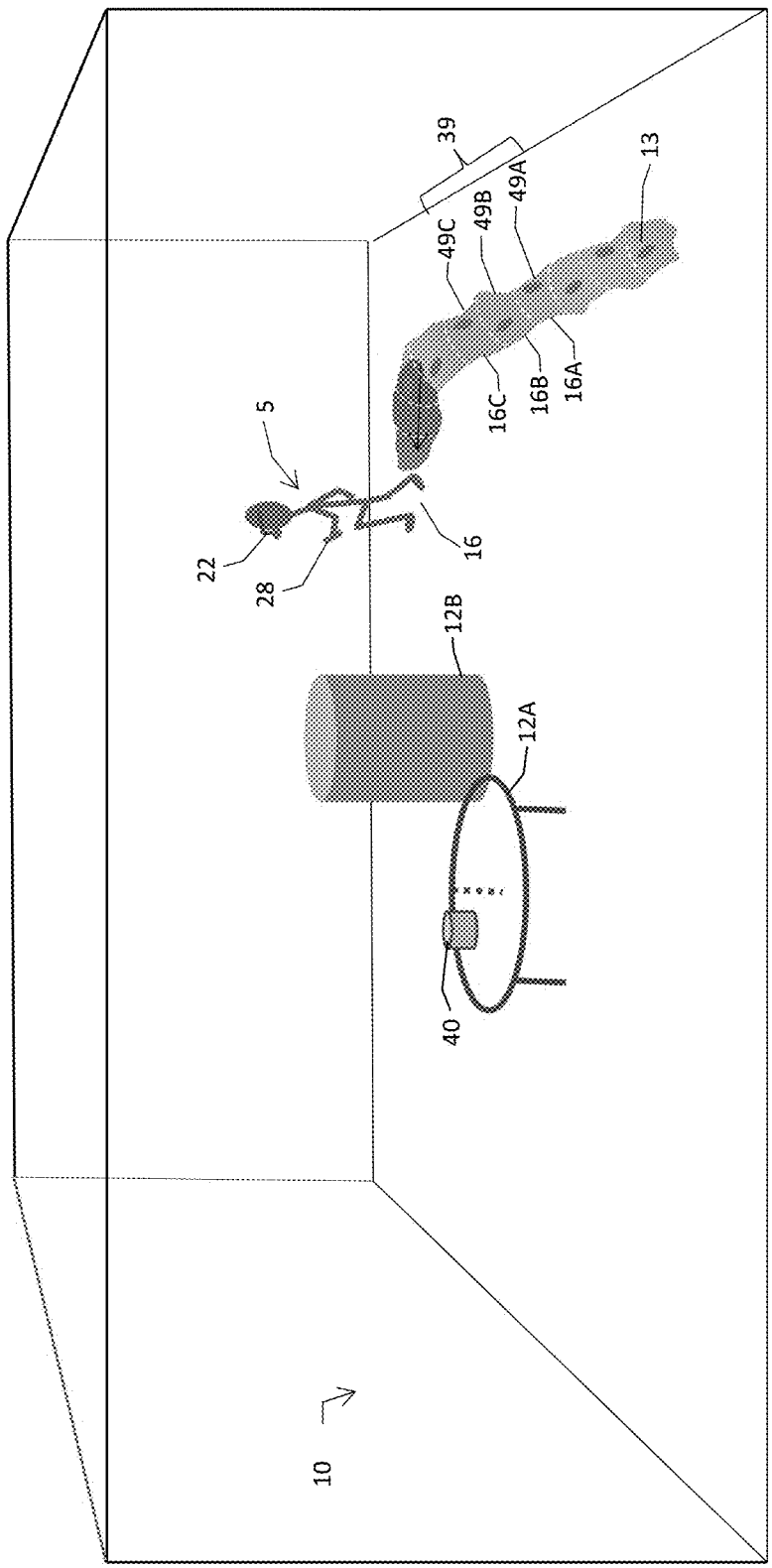
FIG. 7(a) shows a first use case of technologies for interacting with measured radiation data.

Starting with FIG. 7(a), in a first use case, the augmented-reality device 22 tracks radiation 49, to which the user 5 was exposed along a path 13 taken trough the scene 10, as measured by the radiation sensor 28. Further in this example, the augmented-reality device 22 suitably augments reality by presenting a radiation path hologram 39, so the user 5 visualizes his or her radiation exposure 49 along the path 13.

Figure 7B:
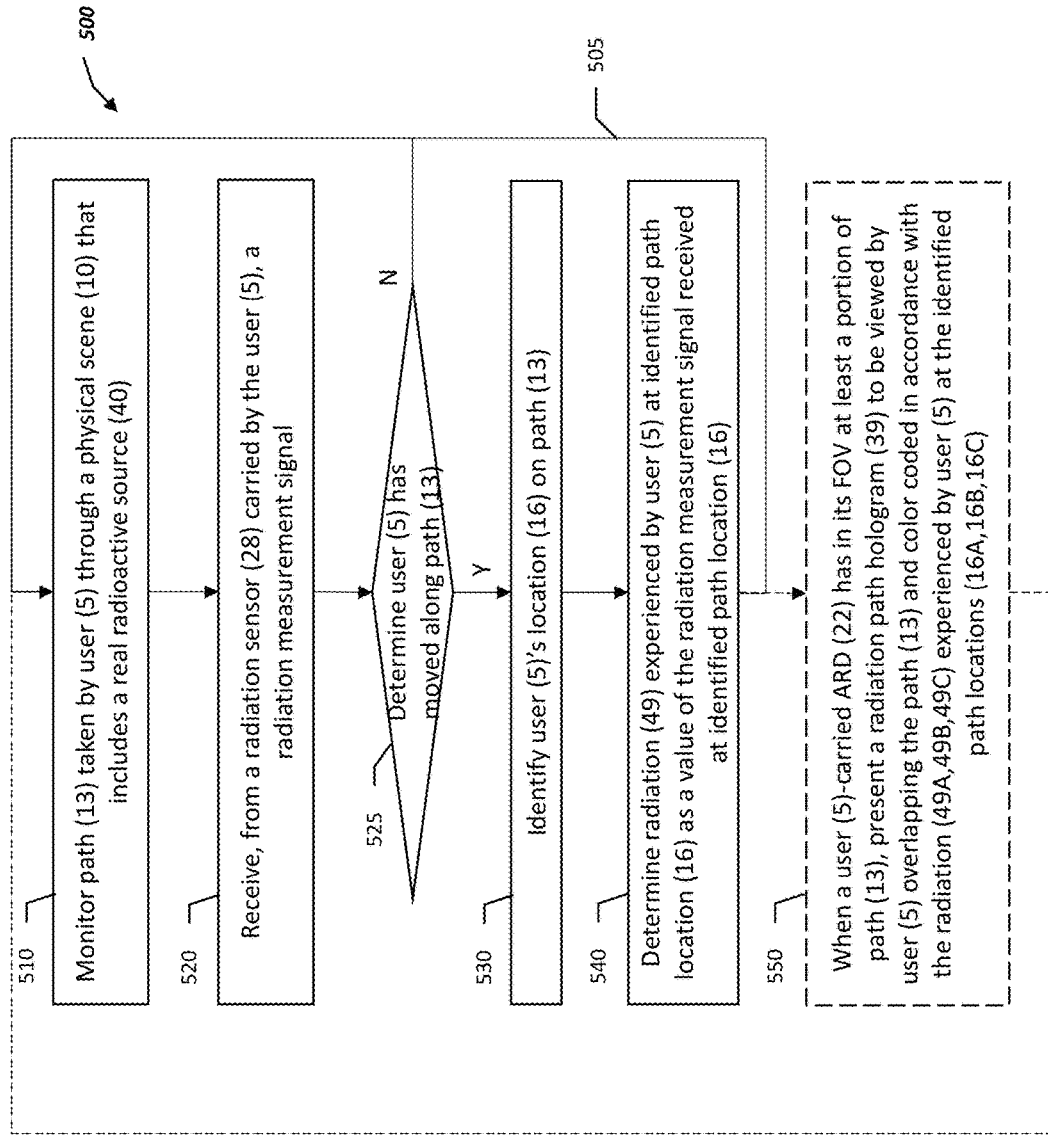
FIGS. 7(b)-7(d) are flowcharts of techniques for performing the first use case.
Figures 7C, 7D:
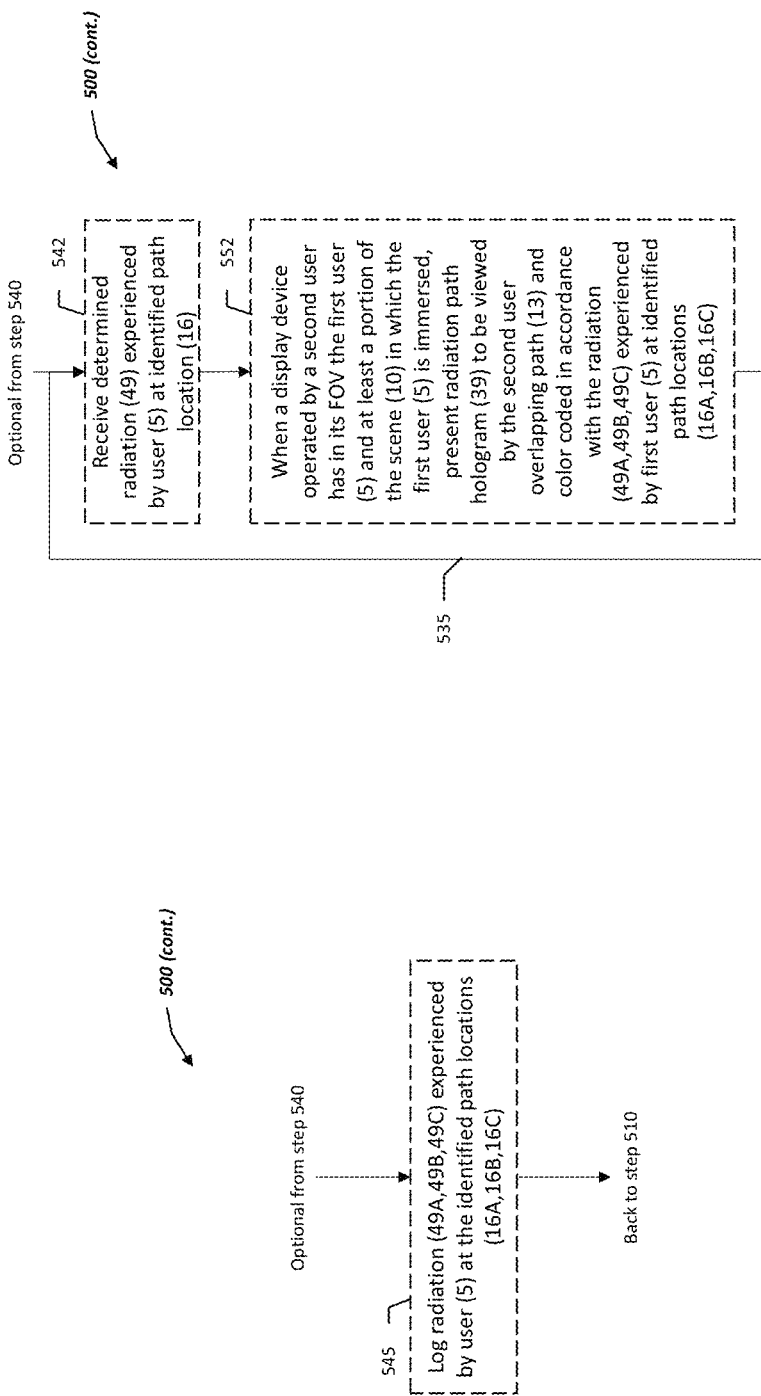

FIGS. 7(b)-7(d) are flowcharts of a first method 500 for interacting with measured radiation data. The method 500 is performed by one or more of the augmented-reality devices 22, 22A, 22B, 22C of system 55. The method 500 includes the following operations.

Referring to FIG. 7(a) and FIG. 7(b), at 510, the tracking means 52 monitors a path 13 taken by a user 5 carrying the augmented-reality device 22 through a scene 10 that includes a radioactive source 40 disposed at a predetermined scene location.

At 520, the controlling means 51 receives a radiation measurement signal from the radiation sensor 28 carried by the user 5. The radiation signal is suitably transmitted by the radiation sensor 28 to the controlling means 51 either continuously or on some predetermined schedule, e.g., 1 transmission per 1 s, per 10 s, per 1 minute, etc. At 525, the tracking means 52 determines whether the user 5 has moved along the path 13. If the user has not moved, the sequence 510 and 520 continues until the tracking means 52 determines that the user 5 has moved along the path 13. If the tracking means 52 determines that the user 5 has moved along the path 13, then, at 530, the tracking means 52 identifies the user 5's location 16 on the path 13.

At 540, the controlling means 51 determines radiation 49 experienced by the user 5 at the identified path location 16 as a value of the radiation measurement signal received at the identified path location 16.

Operations 510, 520, 525, 530, and 540 are repeated as part of loop 505 until the tracking means 52 determines that the user 5 is not in the scene 10. On that account, the augmented-reality device 22 tracks the radiation 49A, 49B, 49C experienced by the user 5 at multiple identified path locations 16A, 16B, 16C.

Referring to FIG. 7(c), in some implementations, at 545, the controlling means 51 logs, e.g., to data store 56E, the radiation 49A, 49B, 49C experienced by the user 5 at the identified path locations 16A, 16B, 16C. Here, the loop 505 includes operations 510, 520, 525, 530, 540, and 545.

Referring again to FIG. 7(a) and FIG. 7(b), in some implementations, when the viewing means 53 has in its FOV at least a portion of the path 13, the viewing means 53 presents at 550 a radiation path hologram 39 so it is viewed by the user 5 overlapping the path 13. Here, the radiation path hologram 39 is color coded in compliance with the radiation 49A, 49B, 49C experienced by the user 5 at respective path locations 16A, 16B, 16C. Alternatively, the radiation path hologram 39 is scaled in size or shape in compliance with the radiation 49A, 49B, 49C experienced by the user 5 at respective path locations 16A, 16B, 16C. In some implementations, the operation of presenting 550 the radiation path hologram 39 includes overlaying the radiation path hologram 39 on a portion of the scene 10's floor corresponding to the portion of the path 13. In some implementations, the operation of presenting 550 the radiation path hologram 39 is suitably performed in response to the user requesting the radiation path hologram 39 through the user interface 54. In these implementations, the loop 505 includes operations 510, 520, 525, 530, 540, and 550.

Referring to FIG. 7(d), a second augmented-reality device is operated by a second user. The second augmented-reality device is communicatively coupled with the first augmented-reality device 22 and performs the following operations.

At 542, the second controlling means receives the determined radiation 49 experienced by the user 5 at the identified path location 16.

When the second viewing means has in its FOV the first user 5 and at least a portion of the scene 10 in which the first user 5 is immersed, the second viewing means presents at 552 the radiation path hologram 39 so it is viewed by the second user overlapping the path 13. Here, the presented radiation path hologram 39 is color coded in compliance with the radiation 49A, 49B, 49C experienced by the first user 5 at the identified path locations 16A, 16B, 16C.

Operations 542 and 552 are then repeated as part of loop 535 until the second tracking means determines that the user 5 is not in scene 10.

II.b) Second Example

Figure 8A:
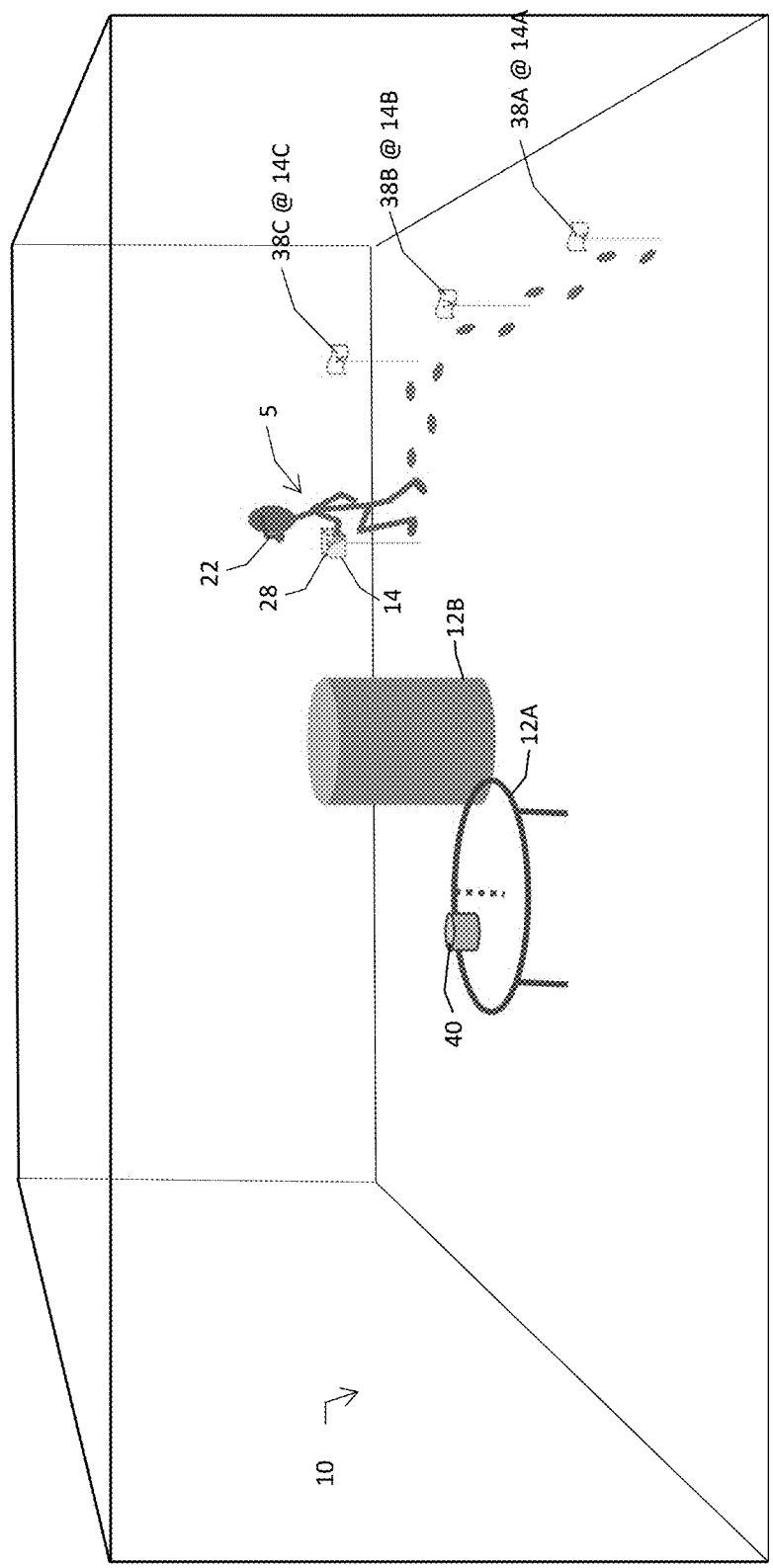
FIG. 8(a) shows a second use case of technologies for interacting with measured radiation data.

Continuing now to FIG. 8(a), in a second use case, the augmented-reality device 22 tracks radiation measurements acquired by the radiation sensor 28 at radiation measurement locations 14 of the scene 10. Further in this example, the augmented-reality device 22 suitably augments reality by presenting radiation measurement indicia 38, so the user 5 visualizes the radiation measurements at scene locations 14.

FIGS. 8(b)-8(e) are flowcharts of a second method 600 for interacting with measured radiation data. The method 600 is performed by one or more of the augmented-reality devices 22, 22A, 22B, 22C of system 55. The method 600 includes the following operations.

Figure 8B:
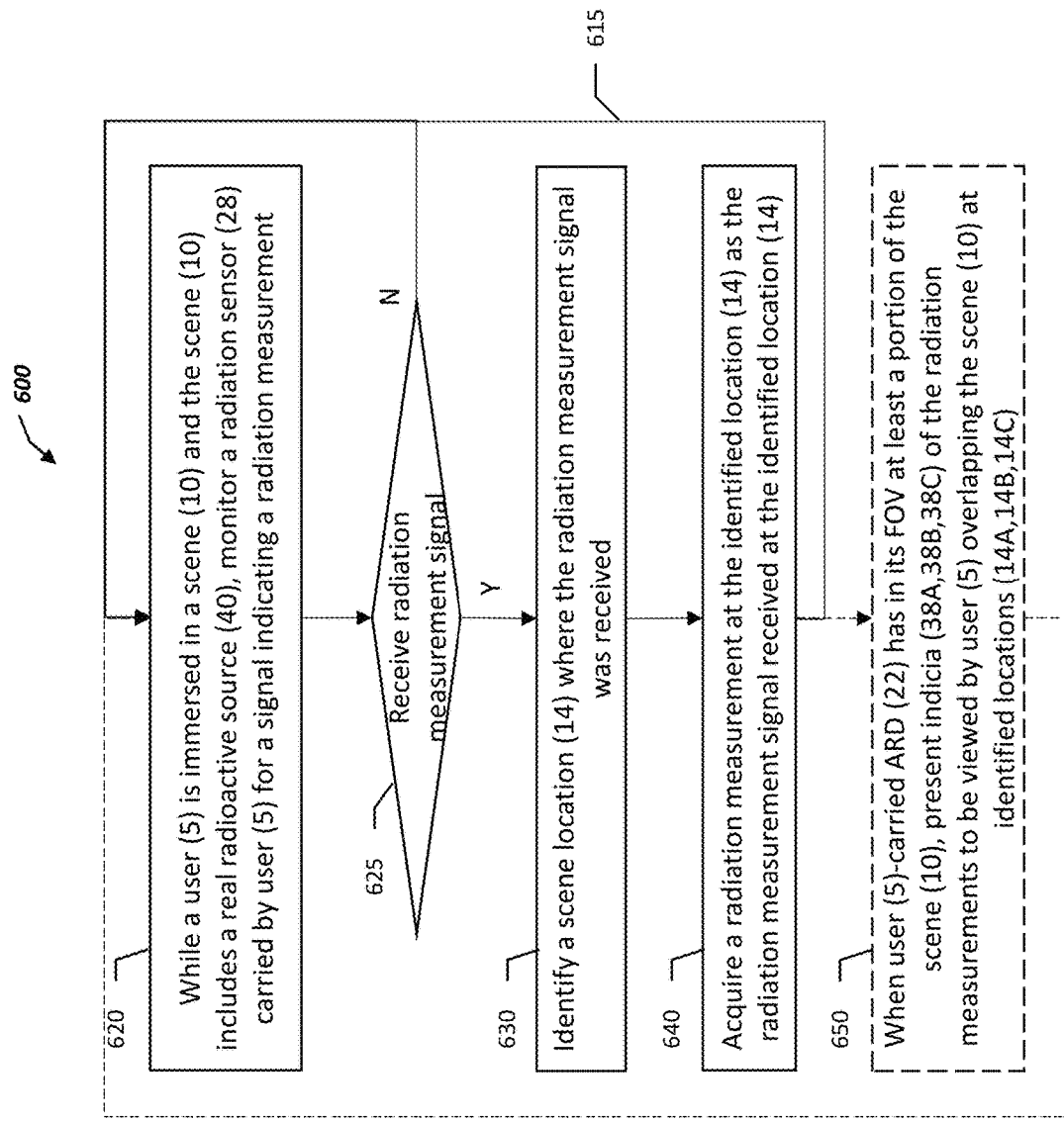
FIGS. 8(b)-8(e) and 8(h) are flowcharts of techniques for performing the second use case.

Referring now to FIG. 8(a) and FIG. 8(b), at 620, while the augmented-reality device 22 is carried by a user 5 through the scene 10 that includes the radioactive source 40 disposed at the predetermined scene location, the controlling means 51 monitors the radiation sensor 28 for a radiation measurement signal. Here, the radiation sensor 28 also is carried by the user 5. The radiation signal is suitably provided by the radiation sensor 28 to the controlling means 51 either programmatically, or in response to the user 5's input.

At 625, the controlling means 51 determines whether a radiation measurement signal is received from the radiation sensor 28. If no radiation measurement signals are received, the sequence 620 and 625 continues until the controlling means 51 receives a radiation measurement signal. If the controlling means 51 receives a radiation measurement signal, then, at 630, the tracking means 52 identifies a scene location 14 where the radiation measurement signal was received.

At 640, the controlling means 51 acquires, at the identified location 14, a radiation measurement as the radiation measurement signal that was received at the identified location 14.

Operations 620, 625, 630, and 640 are repeated as part of loop 615 until the tracking means 52 determines that the user 5 is not in the scene 10. On that account, the augmented-reality device 22 tracks the radiation measurements acquired at multiple identified scene locations 14A, 14B, 14C.

Figures 8C, 8D:
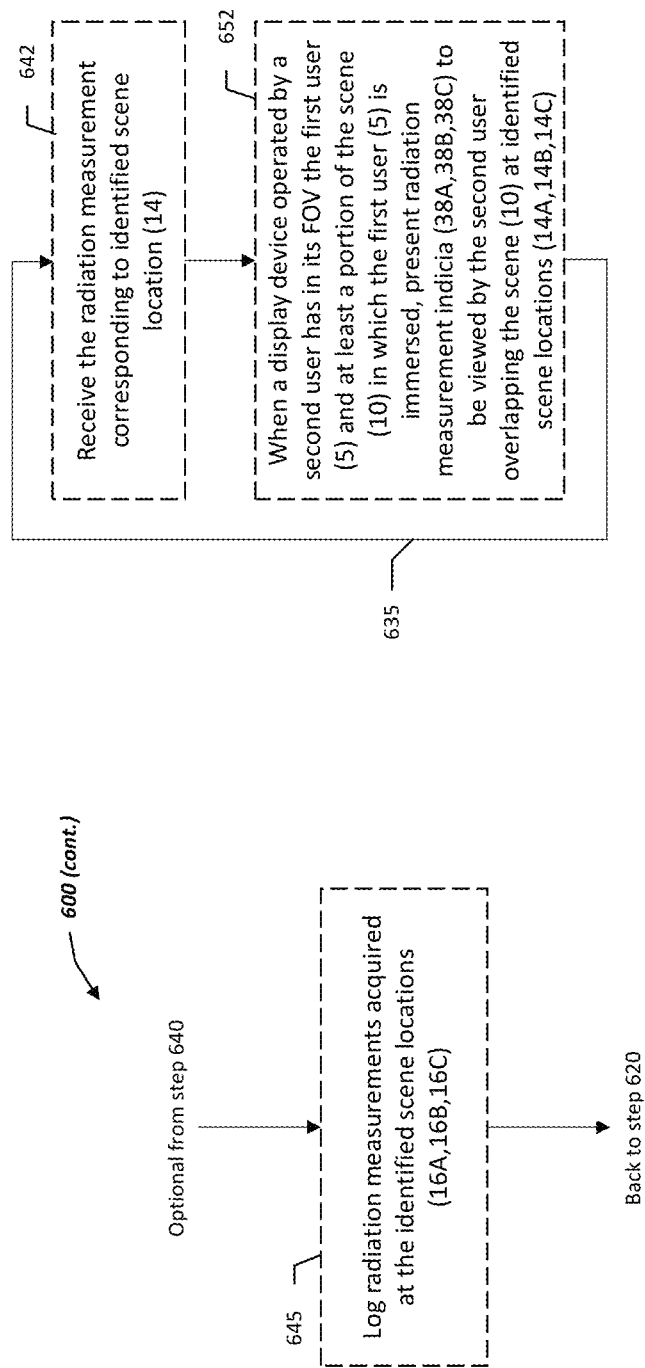

Referring to FIG. 8(c), in some implementations, at 645, the controlling means 51 logs, e.g., to a data store 56E, the radiation measurements acquired at the identified scene locations 14A, 14B, 14C. Here, the loop 615 includes operations 620, 625, 630, 640, and 645.

Referring again to FIG. 8(a) and FIG. 8(b), in some implementations, when the viewing means 53 has in its FOV at least a portion of the scene 10, the viewing means 53 presents at 650 indicia 38A, 38B, 38C of the radiation measurements so they are viewed by the user 5 overlapping the scene 10 at the identified scene locations 14A, 14B, 14C. In some implementations, each of the radiation measurement indicia 38 is one or more of a label, a symbol, or a color-coded marker. In some implementations, the operation of presenting 650 the radiation measurement indicia 38A, 38B, 38C is suitably performed in response to a user requesting the radiation measurement indicia 38A, 38B, 38C through the user interface 54. In these implementations, the loop 615 includes operations 620, 625, 630, 640, and 650.

Referring to FIG. 8(d), a second augmented-reality device is operated by a second user. The second augmented-reality device is communicatively coupled with the first augmented-reality device 22 and performs the following operations.

At 642, the second controlling means receives the radiation measurement acquired at the identified scene location 14.

When the second viewing means has in its FOV the first user 5 and at least a portion of the scene 10 in which the first user 5 is immersed, the second viewing means presents at 652 the radiation measurement indicia 38A, 38B, 38C so they are viewed by the second user overlapping the scene 10 at the identified scene locations 14A, 14B, 14C.

Operations 642 and 652 area then repeated as part of loop 635 until the second tracking means determines that the user 5 is not in the scene 10.

Referring FIG. 8(e), in some implementations, the viewing means 53 assists the controlling means 51 to perform the operation of receiving 625 the radiation measurement as described below.

At 622, when the viewing means 53 has in its FOV at least a portion of the scene 10, the viewing means 53 presents one or more measurement-location indicia 34 so they are viewed by the user 5 overlapping the scene 10 at respective predetermined scene locations 14P. The measurement-location indicia 34 indicate to the user 5 locations where radiation measurements are to be performed. On that account, the user 5 positions the radiation sensor 28 over a presented measurement-location indicium 34 to acquire a radiation measurement at a corresponding predetermined scene location 14P.

Figure 8F:
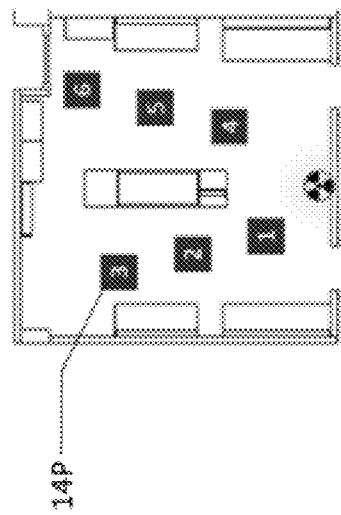
FIGS. 8(f)-8(g) and 8(i)-8(j) show aspects of the techniques for performing the second use case.
Figure 8G:
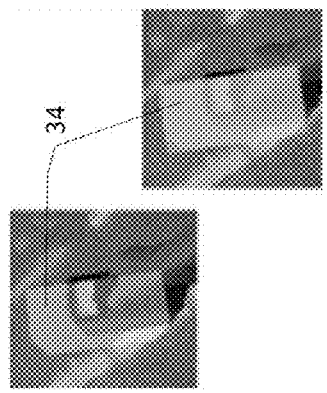
Figure 8E:
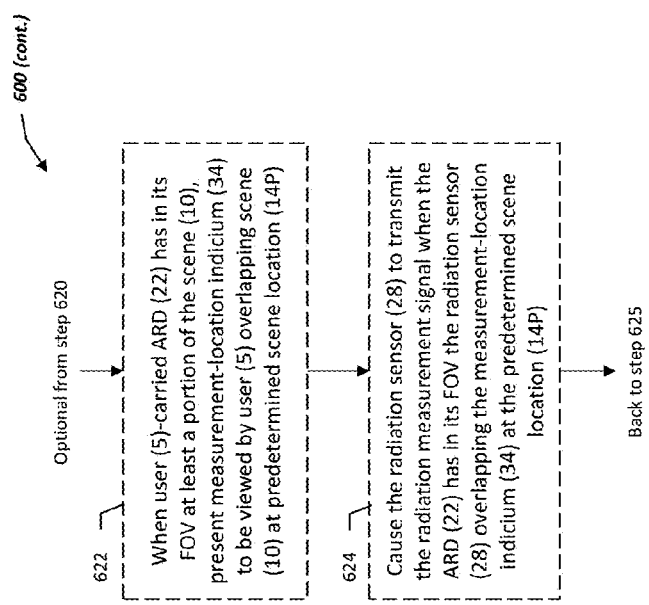

In the example shown in FIG. 8(f), measurements of radiation emitted by a radioactive source 40 are taken at N predetermined scene locations 14P, e.g., here N=6. In the example shown in FIG. 8(g), the viewing means 53 presents, at each of the N predetermined scene locations 14P, a respective measurement-location indicium 34 as a sensor-shaped hologram. In some cases, the measurement-location indicium 34 has a first appearance, e.g., it is colored red, when the radiation sensor 28 does not overlap the measurement-location indicium 34. And a second appearance, e.g., it is colored green, when the radiation sensor 28 overlaps the measurement-location indicium 34. Optionally, the measurement-location indicium 34 is configured to turn green once the radiation sensor 28 has overlapped the measurement-location indicium 34 for a predetermined amount of time, e.g., about 3 seconds.

Referring again to FIG. 8(e), at 624, when the viewing means 53 has in its FOV the radiation sensor 28 overlapping the measurement-location indicium 34 at the predetermined scene location 14P, the controlling means 51 sends a request to the radiation sensor 28 to trigger transmission, by the radiation sensor 28 from the predetermined scene location 14P, of the radiation measurement signal.

Next, we extend method 600, so the extended method is suitably used to validate the technologies for interacting with simulated radiation data that were described in Section I.

II.c) Third Example

Figure 8H:
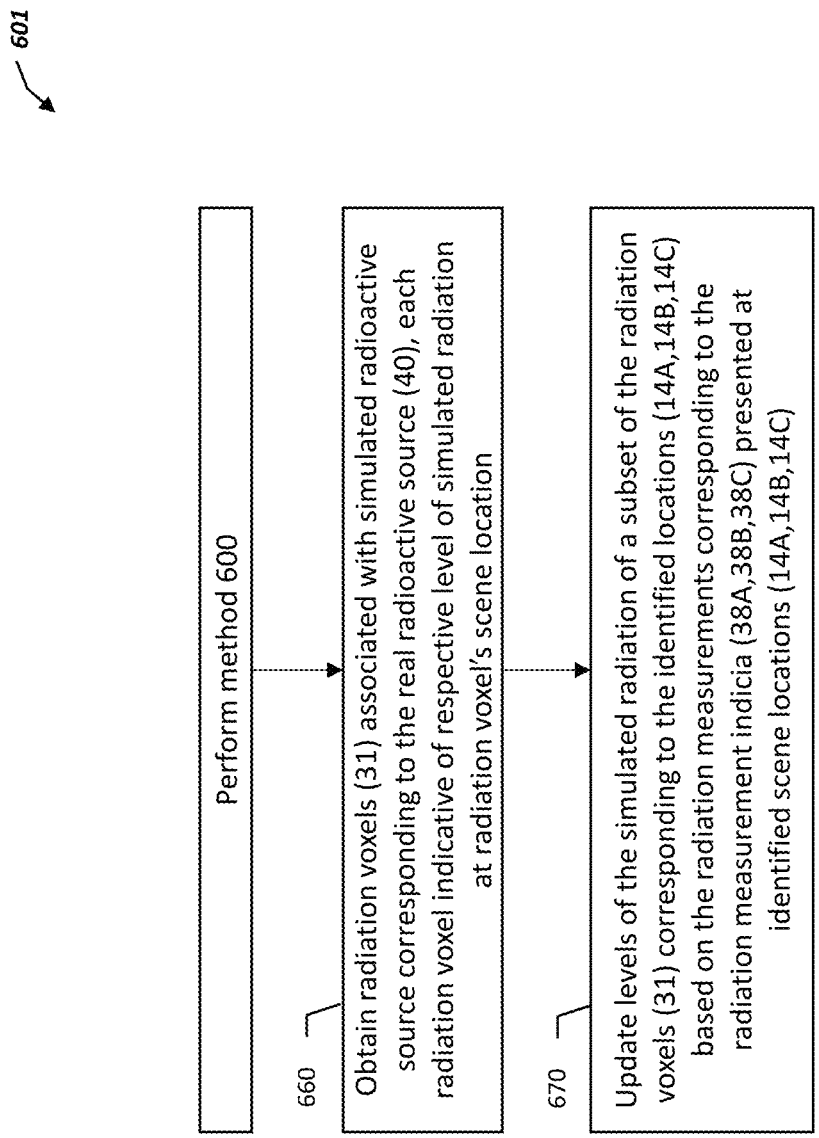

Referring now to FIG. 8(h), method 600 is extended to obtain a validation method 601 performed by the one or more of the augmented-reality devices 22, 22A, 22B, 22C of system 55.

The validation includes identifying and locating an actual radioactive source 40 within a physical scene 10. At predetermined scene locations 14P, radiation measurements were taken representing (i) air ionization responses using a Ludlum 9-4® detector, and (ii) various effective dose responses using a Bicron MicroRem® detector. Background measurements, such as measuring environmental or naturally occurring radiation were initially recorded in each location prior to placement of the radioactive source 40. Environmental radiation values were subtracted from the subsequent source measurements.

In addition to the above-noted subset of operations of method 600, the method 601 includes the following operations.

At 660, the controlling means 51 obtains radiation voxels 31 associated with a simulated radioactive source corresponding to the real radioactive source 40. Each radiation voxel is indicative of a respective level of simulated radiation at the radiation voxel's location of the scene 10. The simulated radioactive source is of the same type, and was placed at the same scene location, as the actual radioactive source 40. The radiation voxels 31 are obtained by the controlling means 51 either by retrieving them from the data storage 56B, or by generating them using one or more radiation transport models.

Figures 8I, 8J:
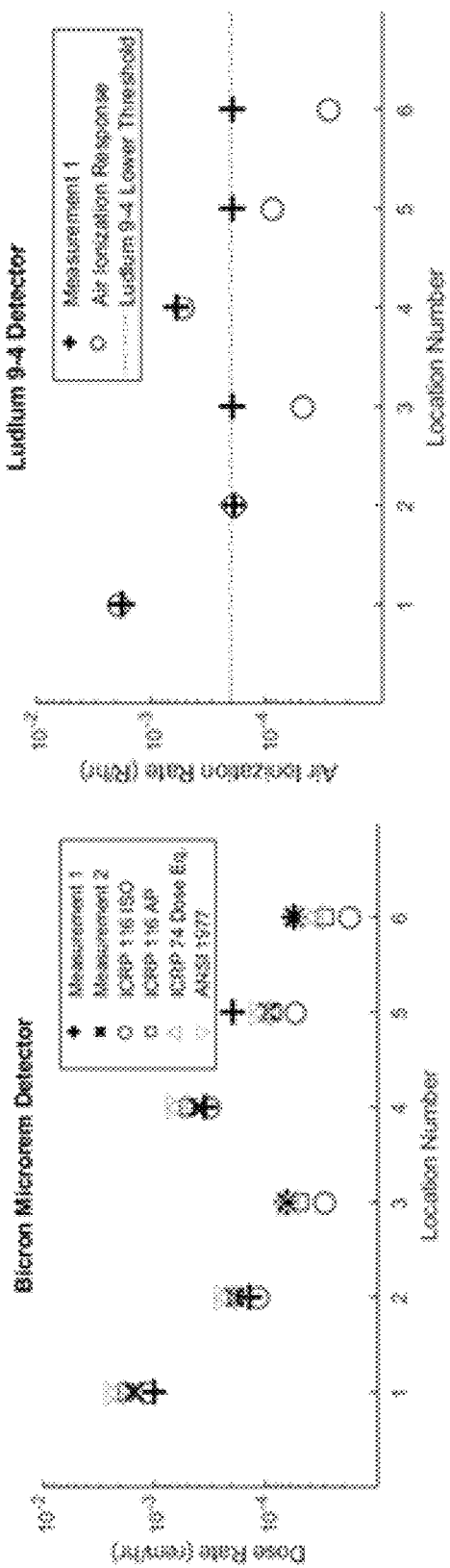

FIG. 8(i) and FIG. 8(j) show the results of the validation using the Bicron® and Ludlum® radiation detectors, respectively. FIG. 8(i) shows a comparison of Bicron microrem detector measurements (+ and × symbols) with various response function calculations (circles, squares, and triangles). Because the exact response function for the Bicron® detector was unknown, multiple measurements were made and evaluated. The International Commission on Radiological Protection (IRCP) 116 response was in substantial agreement with the Bicron® measurements.

FIG. 8(j) shows a comparison of Ludlum 9-4 detector measurements (+ symbols) with air ionization response function calculations (circles). The International Commission on Radiation Units and Measurements (ICRU) air Kerma responses were within the measurement uncertainties of the Ludlum® measurements above the detectable limit.

Referring to FIG. 8(h), since the above-described validation assessment showed that the measured radiological values agreed with the simulated radiological values, the controlling means 51 updates at 670 simulated radiation levels of a subset of the radiation voxels 31 corresponding to the identified locations 14A, 14B, 14C using the radiation measurements acquired at the identified scene locations 14A, 14B, 14C.

II.d) Fourth Example

Figure 9A:
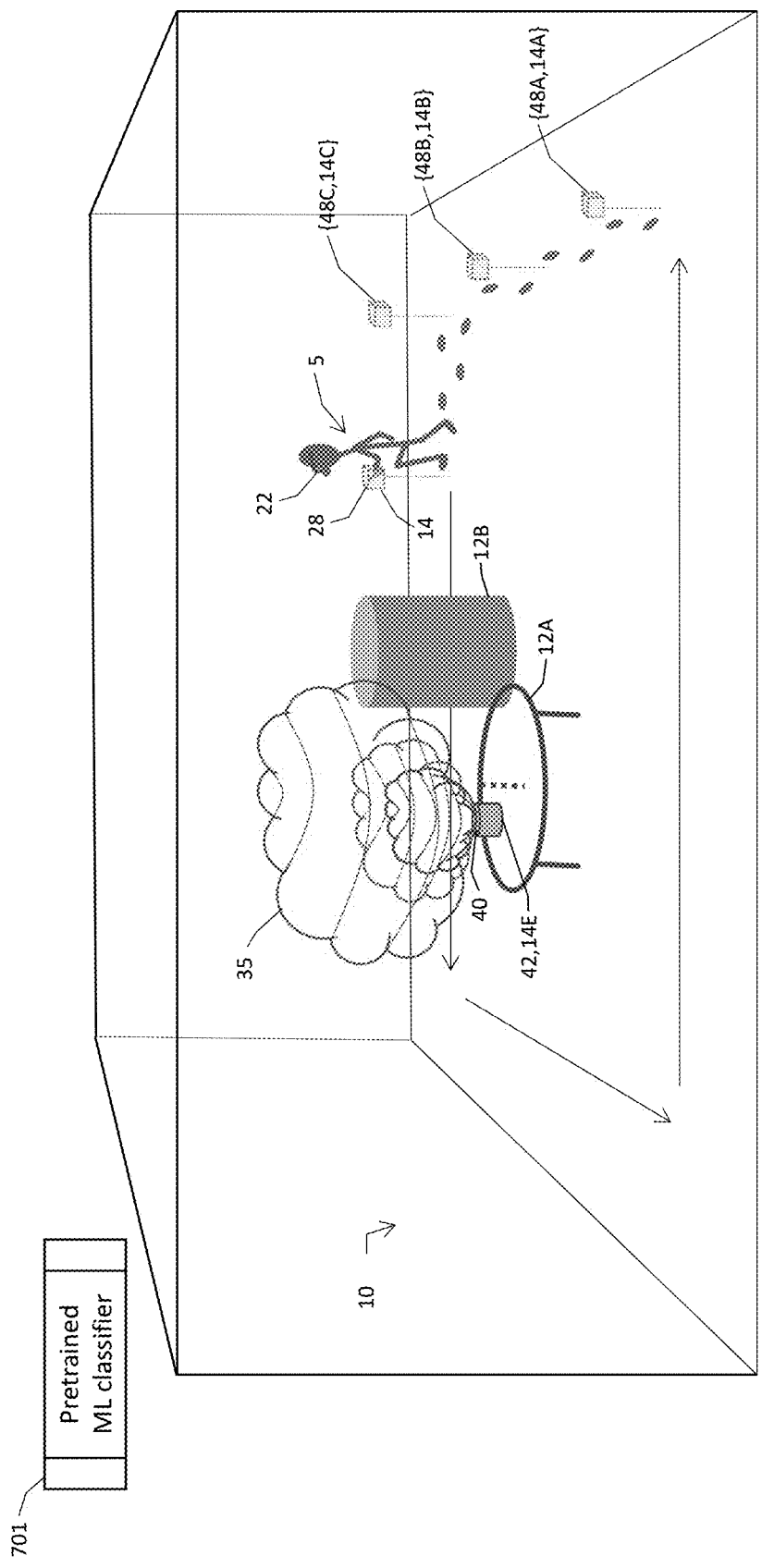
FIG. 9(a) shows a third use case of technologies for interacting with measured radiation data.

Continuing now to FIG. 9(a), in a third use case, the augmented-reality device 22 has access to a machine learning classifier 701 that has been pretrained to estimate a type 42 and a scene location 14E for the radioactive source 40 based on real-time radiation measurements 48 acquired by the radiation sensor 28 at multiple scene locations 14. Therefore, the augmented-reality device 22 uses the pretrained machine learning classifier 701 and a number of spatially resolved radiation measurements {48,14} to estimate the type 42 and the scene location 14E of the radioactive source 40. The augmented-reality device 22 augments reality by presenting a source hologram 35 associated with a simulated radioactive source having the estimated type 42 and being disposed at the estimated scene location 14E, allowing the user 5 to move through the scene 10 around the simulated radioactive source.

Figure 9B:
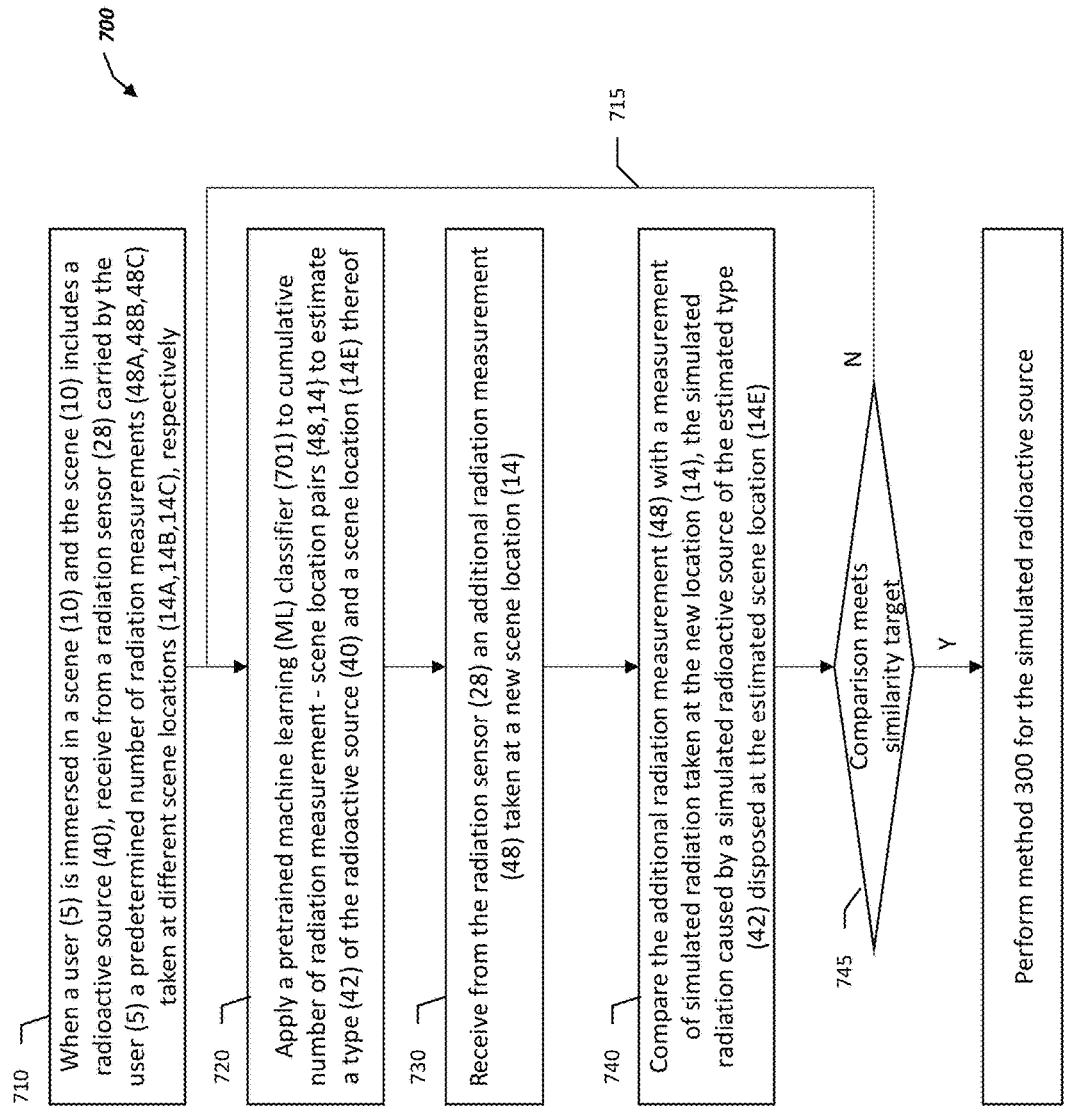
FIG. 9(b) is a flowchart of a technique for performing the third use case.

FIG. 9(b) is a flowchart of a third method 700 for interacting with measured radiation data. The method 700 is performed by one or more of the augmented-reality devices 22, 22A, 22B, 22C of system 55. The method 700 includes the following operations.

Referring now to FIG. 9(a) and FIG. 9(b), at 710, the controlling means 51 receives, while the augmented-reality device 22 is carried by the user 5 immersed in the scene 10 that includes the radioactive source 40, from the radiation sensor 28 also carried by the user 5, a predetermined number of radiation measurements 48A, 48B, 48C taken at respective scene locations 14A, 14B, 14C. In some implementations, the predetermined number of radiation measurements 48A, 48B, 48C taken at the different scene locations 14A, 14B, 14C are within a range of about 5 to about 25 spatially resolved radiation measurements {48,14}. For example, the predetermined number is preferably 13 spatially resolved radiation measurements { 48,14}.

At 720, the controlling means 51 estimates a type 42 of the radioactive source 40 and a scene location 14E of the radioactive source 40 by applying a pretrained machine learning classifier 701 to the received spatially resolved radiation measurements {48A,14A}, {48B,14B}, {48C, 14C}. In some implementations, the controlling means 51 retrieves the pretrained machine learning classifier 701 from to the data store 56F. In some implementations, the machine learning classifier 701 is pretrained to classify types of ionizing radiation sources including gamma sources, X-ray sources, neutron sources, beta sources, an alpha source, or any particle-emitting source of ionizing radiation.

At 730, the controlling means 51 receives, by from the radiation sensor 28, a new radiation measurement 48 taken at a new scene location 14.

At 740, the controlling means 51 compares the new radiation measurement 48 with a measurement of simulated radiation that would be emitted if a simulated radioactive source having the estimated type 42 was disposed at the estimated scene location 14E. Here, a value of the simulated-radiation measurement is a level of one of radiation voxels associated with the simulated radioactive source that corresponds to the new scene location 14. The noted radiation voxels are obtained by the controlling means 51 as described above in connection with operations 110 and 410.

At 745, the controlling means 51 determines whether a result of the comparison meets a similarity target. If the similarity target is not met, then the operations 720, 730, 740, and 745 are repeated as part of loop 715 until the similarity target is met.

If the controlling means 51 determines that the result of the comparison meets the similarity target, then the controlling means 51 exits the loop 715 and the augmented-reality device 22 starts performing the method 300. Here, the augmented-reality device 22 performs the method 300 based on (i) the simulated radioactive source that was estimated at 740 and (ii) its associated radiation voxels.

Because of performing method 300, the augmented-reality device 22 augments reality by presenting a source hologram 35 associated with the noted simulated radioactive source and enable the user 5 to move through the scene 10 in a manner that reduces the user 5's exposure to radiation emitted by the radioactive source 40, even though information about the type and location of the radioactive source 40 was unavailable initially.

Figure 10:
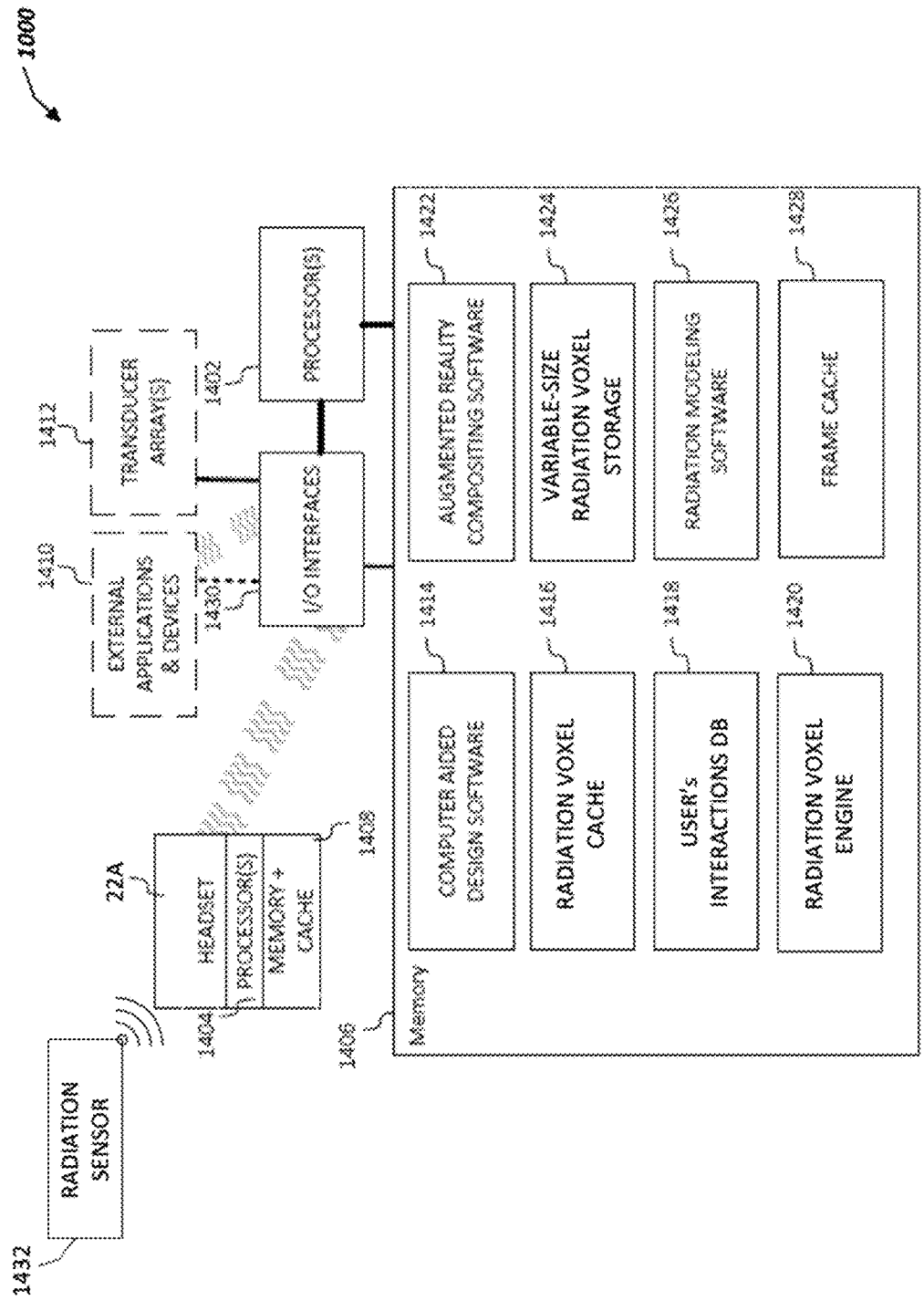
FIG. 10 is a diagram of an example of a system for interacting with simulated/measured radiation data using augmented reality.

III. Other Implementations of the Technologies for Interacting with Simulated/Measured Radiation Data Using Augmented Reality FIG. 10 is a diagram of an example of a system 1000 for interacting with simulated radiation data and measured radiation data using augmented reality in accordance with the process flows, functions, and the systems described herein and those shown in FIGS. 1-9. The system 1000 includes one or more processors, one or more parallel processors or one or more graphical processor (represented as processors 1402 and 1404), a non-transitory machine readable media such as a memory 1406 and a headset memory and cache 1408 (the contents of which are accessible by the one or more processors 1402 and/or 1404), one or more wireless/wired interfaces 1430, a network, optional local/and remote devices 1410, an optional ultrasonic transducer array 1412 (that may include an ultrasonic beamformer(s) that that convey(s) and/or receive(s) ultrasonic signals). The memory 1406 and/or 1408 stores instructions, which when executed by one or more processors 1402 and/or 1404, causes the system to render some or all of the functionality associated with the interactive augmented reality system described herein. The memory 1406 and/or 1408 stores computer aided design software 1414, a radiation voxel cache 1416, a user's interactions database 1418, a radiation voxel engine 1420, augmented reality compositing software 1422, a variable-size radiation voxel storage 1424, radiation modeling software 1426, and a frame cache 1428. In another implementation of system 1000, the non-transitory media provided functionality is served entirely or partially by a cloud system. The term cloud and cloud system are intended to broadly encompass hardware and software that enables the systems and processes described herein (other than a headset 22A) to be executed and data to be maintained, managed, and backed up remotely and made available to users over a network. In this system, clouds and/or cloud storage provides ubiquitous access to the system 1000's resources that can be rapidly provisioned over a public and/or a private network at any location. Clouds and/or cloud storage allows for the sharing of resources, features, and utilities in any location to achieve coherence services.

Alternative implementations of the system 1000 are not limited to the hardware and processes described above. The alternative implementations of the system 1000 execute the process flows, functions, and emulate the systems described and those shown in FIGS. 1-9. In some implementations, components such as a three-dimensional visualization preprocessor, a video/frame cache, a video processor, the headset interface, etc. are part of the interactive augmented reality local architecture remote from the headset 22A. The multiprocessors 1402 and 1404 manipulate and render changing views, visual perspectives and renderings of composite video in response to and in some implementations positively correlated to feedback transmitted by the headset 22A and received through one of the headset's interfaces. Composite images are transmitted through the headset interface(s) and rendered on the headset's screens. The processors (1402 and/or 1404) can include one or more, parallel processor units, and/or processor clusters, and/or graphical processor units, parallel graphical processor units, and/or graphical processor unit clusters.

The cloud/cloud services, memory 1406 and/or 1408 and/or storage disclosed also retain an ordered listing of executable instructions for implementing the processes, system functions, and features described above can be encoded in a non-transitory machine or computer readable medium. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random-Access Memory (RAM), a Read-Only Memory (ROM), an Erasable Programmable Read-Only Memory (EPROM) or a Flash memory, or a database management system. The cloud/cloud services and/or memory 1406 and/or 1408 may include a single device or multiple devices that may be disposed on one or more dedicated memory devices or disposed within a processor, customized circuit or other similar device. When functions, steps, etc. are "responsive to" or occur "in response to" another function or step, etc., the functions or steps necessarily occur as a result of another function or step, etc. A device or process that is responsive to another requires more than an action (i.e., the process and/or device's response to) merely follow another action. A "radiation level" may represent the energy, the angle of flow, and/or the particle type.

The term "engine" refers to a processor or portion of a program that determines how the program manages and manipulates data. For example, a radiation voxel engine 1420 includes the tools for forming and manipulating radiation voxels. The term "substantially" or "about" encompasses a range that is largely in some instances, but not necessarily wholly, that which is specified. It encompasses all but a significant amount, such as what is specified or within five to ten percent. In other words, the terms "substantially" or "about" mean equal to or at or within five to ten percent of the expressed value. The terms "real-time" and "real time" refers to systems that process information at the same rate (or at a faster rate) than they receive data, enabling them to direct and control a process such as an interactive augmented reality process. Some real-time systems operate at a faster rate as the physical element it is controlling. The term communication, in communication with, and versions of the term are intended to broadly encompass both direct and indirect communication connections. Thus, a first and a second part are said to be in communication together when they are in direct communication with one another, as well as when the first device communicates to an intermediate device that communicates either directly or via one or more additional intermediate devices to the second device. The term "augmented reality" refers to superimposing holograms that are either three-dimensional images or two-dimensional images spatially on views of real-world surroundings allowing the user to see the user's natural environment with the spatially superimposed hologram. The term "radiation voxel" refers to a unit of graphic information that defines three-dimensional space and includes radiation-related information.

The system 1000 may be practiced in the absence of any disclosed or expressed element (including the hardware, the software, and/or the functionality expressed), and in the absence of some or all of the described functions association with a process step or component or structure that are expressly described. The system 1000 may operate in the absence of one or more of these components, process steps, elements and/or any subset of the expressed functions.

Further, the various elements and system components, and process steps described in each of the many systems and processes described herein is regarded as divisible with regard to the individual elements described, rather than inseparable as a whole. In other words, alternate implementations of system 1000 encompass any variation and combinations of elements, components, and process steps described herein and may be made, used, or executed without the various elements described (e.g., they may operate in the absence of) including some and all of those disclosed in the prior art but not expressed in the disclosure herein. Thus, some implementations of system 1000 do not include those disclosed in the prior art including those not described herein and thus are described as not being part of those systems and/or components and thus rendering alternative implementations that may be claimed as systems and/or methods excluding those elements and/or steps.

The interactive augmented reality system 1000 includes a validated technology application—or app—using augmented reality hardware to visualize and allow users to interact with ionizing radiation data in real-world environments. The system 10100 uses simulated radiation data calculated and modeled by a modeling and simulation suite for nuclear safety analysis and design software and implemented in a gaming environment such as Unreal Engine® environments that interface headsets such as Microsoft's Hololens 2®. The interactive augmented reality system 1000 renders non-radiological and radiological training, that were validated using one or more radiation sensors 1432 that are communicatively coupled at least with the headset 22A. Training may include separate immersive experiences based on simulated radiation fields, each highlighting different radiological core competencies and operational scenarios that benefit from augmented reality functions rendered by the interactive augmented reality system 1000.

In use, multiple geometries were constructed for various aspects of multiple training exercises, and each served a distinct purpose. Radiation models were based on physical measurements of a space, e.g., taken with the radiation sensor 1432, and were used to perform transport calculations. Computer aided design geometries were developed for diagnostic aides, data orientation confirmation, and hologram occlusion techniques. Headset compliant spatial maps and Light Detection and Ranging (LiDAR) geometries were generated in some implementations of system 1000 for use as ancillary occlusion tools.

In yet other implementations of system 1000, the disclosed technologies can include interactive augmented reality systems that provide sensory input in the form of aural, haptic, and/or visual feed feedback in response to simulated radiation detections and/or in response to simulated radiation levels or thresholds. Such implementations of system 1000 provide audio, tactile, physical, and/or visual guidance or combinations thereof of the simulated radiation's presence and/or its intensity while the interactive augmented reality system 1000 tracks the user's locations, time in those locations, real-time exposure rates, time-integrated exposure amounts (e.g., total integrated dose), and/or the user's physical behaviors in those locations.

Some alternative implementations of the disclosed interactive augmented reality system 1000 include haptic devices that use pre-calculated, or real time measured data, to convey tactile information to a user. Examples include haptic vests, gloves, or helmets that convey vibrational sensations corresponding to radiological data being visualized. Other examples include mid-air haptics where ultrasonic beamforming arrays 1412 project focused acoustic waves in the air that correspond to the shape of a projected hologram. These focused acoustic waves can be "felt" by the user and shaped to represent the isocontours/holograms that the user is seeing as a way to not only show a user radiation, but also to feel radiation.

In other alternative implementations, the augmented-reality system 1000 can include a headset 42A that has a pair of three-dimensional audio speakers. The audio drivers of the speakers adjust output to enhance and/or not obstruct external natural-environment sounds allowing users to hear augmented reality and natural-environment sounds or pre-recorded audio instructions. In some cases, the output drivers generate sound that simulates three dimensional aural sound, e.g., binaural aural audio, in the user's real-world environment to simulate the spatial effects an augmented reality noise would sound like if it was emanating from or made by only one or more real physical object in a local or remote location to the user in the physical space or because a real-world event occurred in the user's environment. In other words, here the synthetic audio is customized to and appears to originate from the geographic location of the augmented reality object as if that augmented reality object was just a physical real-world object and/or if the event was occurring or occurred in the user's real-world environment. The three-dimensional sound allows users to perceive and identify the projected location of a synthetic sound as if the synthetic sound originated from and/or was made at that location within the user's real-world physical environment.

Particular implementations of the subject matter have been described. Other implementations are within the scope of the following claims.

The invention claimed is:

1. A system comprising:
   an augmented-reality device that comprises controlling means, tracking means, and viewing means, wherein the augmented-reality device is configured to perform operations comprising:
     obtaining, by the controlling means, radiation voxels associated with a simulated radiation field caused as if a radioactive source of a particular type was emitting radiation from a predetermined location of a physical scene, each radiation voxel indicative of a respective level of the simulated radiation field at the radiation voxel's scene location;
     monitoring, by the tracking means, a path taken by a user that carries the augmented-reality device through the scene;
     determining, by the tracking means, whether the user has moved along the path, and if so, identifying a user's location on the path; and
     determining, by the controlling means, simulated radiation experienced by the user at the identified path location as a metric of levels of a subset of the radiation voxels that overlap the identified path location.

2. The system of claim 1, wherein the augmented-reality device is configured to perform operations comprising:
   presenting, by the viewing means when the viewing means have in their field of view at least a portion of the path, a simulated-radiation path hologram to be viewed by the user overlapping the path, where the simulated-radiation path hologram is color coded or scaled in size or shape in accordance with the simulated radiation experienced by the user at the identified path locations.

3. The system of claim 2, wherein
   the augmented-reality device comprises a user interface; and
   the operation of presenting the simulated-radiation path hologram occurs in response to receiving, in the user interface, user input requesting presentation of the simulated-radiation path hologram.

4. The system of claim 2, wherein the operation of presenting the simulated-radiation path hologram comprises overlaying the simulated-radiation path hologram on a portion of a scene's floor corresponding to the portion of the path.

5. The system of claim 1, wherein
   the augmented-reality device comprises a user interface that includes one or more speakers; and
   the augmented-reality device is configured to perform operations comprising:
     transmitting, by the controlling means, instructions to the speakers to emit audio sounds corresponding to the simulated radiation experienced by the user at the identified path locations, and
     emitting, by the speakers, the audio sounds in response to receiving the instructions.

6. The system of claim 5, wherein the operation of transmitting to the speakers the instructions to emit the audio sounds occurs in response to receiving, in the user interface, user input requesting audio guidance.

7. The system of claim 1, wherein the augmented-reality device is configured to perform operations comprising:
   logging, by the controlling means to a data store, the simulated radiation experienced by the user at the identified path locations.

8. The system of claim 1, wherein the operation of determining the simulated radiation experienced by the user at the identified path location comprises averaging the levels of the radiation voxels of the subset.

9. The system of claim 1, wherein the operation of determining the simulated radiation experienced by the user at the identified path location comprises calculating one or more of a maximum, a minimum, a range, or a median of the levels of the radiation voxels of the subset.

10. The system of claim 1, comprising:
    a second augmented-reality device to be operated by a second user, wherein the second augmented-reality device is communicatively coupled with the first augmented-reality device and comprises second controlling means, second tracking means, and second viewing means, and wherein the second augmented-reality device is configured to perform second operations comprising:
      receiving, by the second controlling means, the determined simulated radiation experienced by a first user at the identified path location; and
      presenting, by the second viewing means when the second viewing means have in their field of view the first user and at least a portion of the scene in which the first user is immersed, the simulated-radiation path hologram to be viewed by the second user overlapping the path and color coded in accordance with the simulated radiation experienced by the first user at the identified path locations.

11. The system of claim 1, wherein the augmented-reality device is configured to perform operations comprising:
    obtaining, by the controlling means, one or more isocontours or point clouds corresponding to respective levels of the radiation voxels; and
    presenting, by the viewing means when the viewing means has in its field of view at least a portion of the scene, the one or more isocontours or point clouds as a source hologram to be viewed by the user overlapping the scene in accordance with an orientation of a viewing means' line of sight (LOS) relative to the scene.

12. The system of claim 11, wherein
    the augmented-reality device comprises a user interface, and
    the operation of presenting the source hologram occurs in response to receiving, in the user interface, user input requesting presentation of the source hologram.

13. The system of claim 1, wherein the operation of obtaining the radiation voxels comprises retrieving, from a data storage, predetermined radiation voxels.

14. The system of claim 1, wherein the operation of obtaining the radiation voxels comprises determining, by the controlling means, the radiation voxels using one or more radiation transport models.

15. The system of claim 1, wherein the particular type of the radioactive source with which the radiation voxels are associated is one of a gamma source, an X-ray source, a neutron source, a beta source, an alpha source, or any particle-emitting source of ionizing radiation.

16. The system of claim 1, wherein the augmented-reality device comprises one of an augmented-reality headset, a smartphone, or a tablet.

17. A system comprising:
an augmented-reality device that comprises controlling means, tracking means, and viewing means, wherein the augmented-reality device is configured to perform operations comprising:
obtaining, by the controlling means, radiation voxels associated with a simulated radiation field caused as if a radioactive source of a particular type was emitting radiation from a predetermined location of a physical scene, each radiation voxel indicative of a respective level of the simulated radiation field at the radiation voxel's scene location;
monitoring, by the viewing means, for a measurement input performed by a user that carries the augmented-reality device through the scene, wherein the measurement input indicates a request for a simulated-radiation measurement;
detecting, by the viewing means, whether the measurement input has been provided by the user, and if so identifying, by the tracking means, a scene location where the measurement input was detected; and
acquiring, by the controlling means at the identified scene location, the simulated-radiation measurement as a level of one of the radiation voxels that corresponds to the identified scene location.

18. The system of claim 17, wherein the augmented-reality device is configured to perform operations comprising:
presenting, by the viewing means when the viewing means has in its field of view at least a portion of the scene, indicia of the simulated-radiation measurements to be viewed by the user overlapping the scene at the identified scene locations.

19. The system of claim 18, wherein
the augmented-reality device comprises a user interface, and
the operation of presenting the simulated-radiation measurement indicia occurs in response to receiving, in the user interface, user input requesting presentation of the simulated-radiation measurement indicia.

20. The system of claim 17, wherein
the augmented-reality device comprises a user interface that includes one or more speakers; and
the augmented-reality device is configured to perform operations comprising:
transmitting, by the controlling means, instructions to the speakers to emit sounds corresponding to the simulated-radiation measurements acquired at the identified scene locations, and
emitting, by the speakers, the audio sounds in response to receiving the instructions.

21. The system of claim 17, wherein the augmented-reality device is configured to perform operations comprising:
logging, by the controlling means to a data store, the simulated-radiation measurements acquired at the identified scene locations.

22. The system of claim 17, wherein the measurement input comprises a hand gesture to be provided by the user within the field of view of the viewing means, and the hand gesture comprises an air pinch or a finger snap.

23. The system of claim 17, wherein the measurement input comprises a hand gesture to be provided by the user to a haptic display of the viewing means, and the hand gesture comprises one of one or more tap gestures, one or more swipe gestures, a pinch gesture, or a reverse pinch gesture.

24. The system of claim 17, wherein each of the simulated-radiation measurement indicia comprises one or more of a label, a symbol, or a color-coded marker.

25. The system of claim 17, comprising:
a second augmented-reality device to be operated by a second user, wherein the second augmented-reality device is communicatively coupled with the first augmented-reality device and comprises second controlling means, second tracking means, and second viewing means, and wherein the second augmented-reality device is configured to perform second operations comprising:
receiving, by the second controlling means, the simulated-radiation measurement corresponding to the identified scene location; and
presenting, by the second viewing means when the second viewing means has in its field of view a first user and at least a portion of the scene in which the first user is immersed, the simulated-radiation measurement indicia to be viewed by the second user overlapping the scene at the identified scene locations.

26. A system comprising:
an augmented-reality device that comprises controlling means, tracking means, and viewing means, wherein the augmented-reality device is configured to perform operations comprising:
obtaining, by the controlling means, one or more isocontours for corresponding levels of radiation voxels, wherein the radiation voxels are associated with a simulated radiation field caused as if a radioactive source of a particular type was emitting radiation from a predetermined location of a physical scene, each radiation voxel indicative of a respective level of the simulated radiation field at the radiation voxel's scene location;
when the viewing means of the augmented-reality device, that is carried by a user through the scene, has in its field of view at least a portion of the scene, presenting, by the viewing means, the one or more isocontours as a source hologram to be viewed by the user overlapping the scene in accordance with an orientation of the viewing means' line of sight (LOS) relative to the scene;
monitoring, by the tracking means, orientation of the LOS relative to the scene; and
detecting, by the tracking means, whether the relative orientation of the LOS is new, and if so, updating, by the viewing means, the source hologram's presentation based on the new LOS relative orientation.

27. The system of claim 26, wherein the operation of obtaining the one or more isocontours comprises retrieving, from a data storage, precalculated isocontours.

28. The system of claim 26, wherein the operation of obtaining the one or more isocontours comprises:

obtaining, by the controlling means, the radiation voxels by retrieving them from a data storage; and determining, by the controlling means, the one or more isocontours using the obtained radiation voxels.

29. The system of claim 26, wherein the operation of presenting the source hologram and the operation of updating the source hologram's presentation each comprises:

when the LOS is oriented relative to the scene such that the source hologram is to be viewed by the user behind a scene object, presenting only portions of the source hologram that lack spatial overlap with the scene object.

30. The system of claim 26, wherein the augmented-reality device is configured to perform operations comprising:

retrieving, by the controlling means from a data storage, a digital scene corresponding to the physical scene, the digital scene having a common spatial scale with the radiation voxels;

when the viewing means has in its field of view one or more objects of the physical scene, recognizing, by the tracking means, corresponding objects of the digital scene, and determining, by the controlling means, a relative scale between the physical scene's objects and the corresponding digital scene's objects; and the operation of presenting the source hologram and the operation of updating the source hologram's presentation each is performed based on the determined relative scale.

31. The system of claim 30, wherein the digital scene comprises a 3-dimensional computer-aided design geometry of the physical scene.

32. The system of claim 26, comprising:

a second augmented-reality device to be operated by a second user, wherein the second augmented-reality device is communicatively coupled with the first augmented-reality device and comprises second controlling means, second tracking means, and second viewing means, and wherein the second augmented-reality device is configured to perform second operations comprising:

obtaining, by the second controlling means, the one or more isocontours; and presenting, by the second viewing means when the second viewing means has in its field of view a first user and at least a portion of the scene in which the first user is immersed, the one or more isocontours as the source hologram to be viewed by the second user overlapping the scene in accordance with an orientation of the second viewing means' LOS relative to the scene.

33. The system of claim 32, wherein the operation of obtaining the one or more isocontours comprises receiving, by the second controlling means from the first augmented-reality device, the one or more isocontours.

* * * * *